(12) United States Patent
Murata

(10) Patent No.: US 9,024,613 B2
(45) Date of Patent: May 5, 2015

(54) SWITCHING POWER SUPPLY APPARATUS AND SEMICONDUCTOR DEVICE

(71) Applicant: Panasonic Corporation, Osaka (JP)

(72) Inventor: Kazuhiro Murata, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/078,429

(22) Filed: Nov. 12, 2013

(65) Prior Publication Data

US 2014/0071717 A1 Mar. 13, 2014

Related U.S. Application Data

(63) Continuation of application No. PCT/JP2011/002817, filed on May 20, 2011.

(51) Int. Cl.
| | |
|---|---|
| *H02M 3/156* | (2006.01) |
| *H02M 3/335* | (2006.01) |
| *H02M 1/00* | (2006.01) |

(52) U.S. Cl.
CPC .......... *H02M 3/33507* (2013.01); *H02M 3/156* (2013.01); *H02M 2001/0022* (2013.01)

(58) Field of Classification Search
USPC ...................... 363/21.12–21.18; 323/282–285
See application file for complete search history.

(56) References Cited

U.S. PATENT DOCUMENTS

| | | | | |
|---|---|---|---|---|
| 7,276,861 | B1 * | 10/2007 | Shteynberg et al. | .......... 315/291 |
| 7,518,885 | B2 | 4/2009 | Baurle et al. | |
| 7,548,437 | B2 * | 6/2009 | Choi et al. | ................. 363/21.09 |
| 7,778,050 | B2 * | 8/2010 | Yamashita | ................. 363/21.16 |
| 8,000,114 | B2 | 8/2011 | Baurle et al. | |
| 8,279,627 | B2 | 10/2012 | Baurle et al. | |
| 8,368,370 | B2 * | 2/2013 | Morrish | ........................ 323/282 |
| 8,427,850 | B2 * | 4/2013 | Morota et al. | ............. 363/56.11 |
| 8,537,570 | B2 * | 9/2013 | Balakrishnan et al. | .... 363/21.01 |

(Continued)

FOREIGN PATENT DOCUMENTS

| | | |
|---|---|---|
| JP | 06-303767 A | 10/1994 |
| JP | 2007-110803 A | 4/2007 |

(Continued)

OTHER PUBLICATIONS

International Search Report issued in International Application No. PCT/JP2011/002817 with Date of mailing Aug. 9, 2011.

*Primary Examiner* — Jessica Han
(74) *Attorney, Agent, or Firm* — McDermott Will & Emery LLP

(57) ABSTRACT

A switching power supply apparatus includes: an input terminal; an output terminal; a switching element; an input and output converting unit which converts input voltage applied through the switching element into output voltage to supply output power to a load; an output voltage feedback unit which outputs a feedback signal, based on the output voltage; a switch current detecting unit which detects current flowing through the switching element; an oscillating frequency setting unit which sets the switching frequency of the switching element, based on the feedback signal; a peak current setting unit which controls turn-off of the switching element by setting a current threshold such that a switch current peak (i) is constant regardless of a change in the output power and (ii) increases as the input voltage increases; and a switching control unit which controls switching operation of the switching element.

14 Claims, 27 Drawing Sheets

(56) References Cited

U.S. PATENT DOCUMENTS

| | | |
|---|---|---|
| 2007/0210772 A1* | 9/2007 | Sawtell .................. 323/282 |
| 2008/0084713 A1 | 4/2008 | Baurle et al. |
| 2009/0185396 A1 | 7/2009 | Baurle et al. |
| 2010/0033992 A1 | 2/2010 | Fukui et al. |
| 2010/0201335 A1* | 8/2010 | Li et al. .................. 323/284 |
| 2011/0002147 A1 | 1/2011 | Fukui |
| 2011/0273910 A1 | 11/2011 | Baurle et al. |
| 2012/0320634 A1 | 12/2012 | Baurle et al. |

FOREIGN PATENT DOCUMENTS

| | | |
|---|---|---|
| JP | 2008-092794 A | 4/2008 |
| JP | 2008-172979 A | 7/2008 |
| JP | 2010-041832 A | 2/2010 |
| JP | 2011-015557 A | 1/2011 |
| JP | 2011-097775 A | 5/2011 |

* cited by examiner

Conventional technique

Embodiment 2

SWITCHING POWER SUPPLY APPARATUS AND SEMICONDUCTOR DEVICE

CROSS REFERENCE TO RELATED APPLICATION

This is a continuation application of PCT Patent Application No. PCT/JP2011/002817 filed on May 20, 2011, designating the United States of America. The entire disclosure of the above-identified application, including the specification, drawings and claims are incorporated herein by reference in its entirety.

FIELD

The present disclosure relates to a switching power supply apparatus and a semiconductor device each of which regulates output voltage by implementing switching of input voltage using a switching element.

BACKGROUND

Switching power supply apparatuses have been widely used as power supply units of appliances for common household use, such as home electrical products. A switching power supply apparatus includes a semiconductor device which regulates (for example, stabilizes) output voltage at a constant level through switching operation using semiconductor elements (switching elements such as transistors), for purposes such as improvement of power efficiency by reducing power consumption.

For example, Patent Literature (PTL) 1 discloses a switching power supply apparatus which includes a transformer with a plurality of secondary windings. The switching power supply apparatus disclosed in PTL 1 further includes an average value calculating unit and a voltage feedback control unit.

The average value calculating unit calculates an average value of output voltages generated by the secondary windings. The voltage feedback control unit performs pulse width modulation (PWM) control or pulse frequency modulation (PFM) control to control conduction of a primary winding of the transformer so that the error between the average value calculated by the average value calculating unit and a target setting voltage is zero. The PWM and PFM controls are examples of switching operation of the switching element.

CITATION LIST

Patent Literature

[PTL 1] Japanese Unexamined Patent Application Publication No. 2008-172979

SUMMARY

Technical Problem

However, the conventional technique is not capable of increasing power efficiency at high input voltage.

A possible cause for the decrease in power efficiency is a loss caused by the switching operation of the switching element. The loss caused by the switching operation increases with an increase in (i) the current flowing through the switching element during the switching operation or (ii) voltage (drain voltage) between two terminals (for example, between source and drain) of the switching element during the switching operation. The voltage between the two terminals of the switching element monotonically increases according to an increase in input voltage. Hence, a loss caused by the switching operation increases as input voltage increases. As a result, power efficiency decreases at high input voltage.

One non-limiting and exemplary embodiment has been conceived to solve the conventional problem, and provides a switching power supply apparatus and a semiconductor device each of which is capable of increasing the power efficiency at high input voltage.

Solution to Problem

In order to solve the above problem, a switching power supply apparatus according to an aspect of the present disclosure includes: an input terminal; an output terminal; a switching element connected to the input terminal; an input and output converting unit which converts an input voltage into an output voltage to supply output power to a load connected to the output terminal, the input voltage being input to the input terminal and applied through the switching element; an output voltage feedback unit which detects the output voltage and to output a feedback signal, based on the detected output voltage; a switch current detecting unit which detects a current flowing through the switching element; an oscillating frequency setting unit which sets a switching frequency of the switching element, based on the feedback signal; a peak current setting unit which sets a current threshold to control turn-off of the switching element, based on a result of the detection by the switching current detecting unit and the current threshold, the current threshold being set such that a switch current peak is constant regardless of a change in the output power and increases as the input voltage increases, the switch current peak being a maximum value of the current flowing through the switching element; and a switching control unit which controls a switching operation of the switching element, based on results of the setting by the oscillating frequency setting unit and by the peak current setting unit.

With the configuration, in a PFM operating mode in which the switch current peak is constant relative to output power, a current threshold is set so that the switch current peak increases as input voltage increases. When the switch current peak increases, the switching frequency decreases to maintain output power constant. When the oscillating frequency decreases, the number of switching operations in a predetermined period decreases. Hence, a loss caused by the switching operation in the predetermined period decreases. Accordingly, since a loss cause by the switching operation decreases at high input voltage, it is possible to increase the power efficiency at high input voltage.

Furthermore, it may be that the peak current setting unit includes: an input voltage detecting unit which detects the input voltage; and a switch current peak setting unit which sets the current threshold to (i) be constant regardless of a change in the output power and (ii) increase as the input voltage detected by the input voltage detecting unit increases.

With the configuration, the input voltage detecting unit which detects input voltage is included, and a current threshold is set based on the detected input voltage. As a result, it is possible not only to increase the power efficiency at high input voltage, but also to increase flexibility in design of circuit configuration of the switching power supply apparatus.

Furthermore, it may be that when the output power is above a first threshold, (i) the oscillating frequency setting unit sets the switching frequency to be constant regardless of a change in the output power, and (ii) the peak current setting unit sets the current threshold to increase as the output power increases, and when the output power is below the first threshold, (i) the oscillating frequency setting unit sets the switching frequency to decrease as the output power decreases, and (ii) the peak current setting unit sets the current threshold to (1) be constant regardless of a change in the output power and (2) increase as the input voltage increases.

With the configuration, when output power is above a first threshold, that is, at a heavy load, switching operation is controlled in the PWM operating mode, and when the output power is below the first threshold, that is, at a light load, the switching operation is controlled in the PFM operating mode. Accordingly, it is possible to increase the power efficiency across the entire output power range (entire load range) at high input voltage. In particular, it is possible to decrease the loss caused by the switching operation at high input voltage and at a light load which is significantly influenced by the loss caused by the switching operation.

Furthermore, it may be that when the output power is above the first threshold, the peak current setting unit sets the current threshold to (i) be constant regardless of a change in the input voltage and (ii) increase as the output power increases.

With the configuration, in the PWM operating mode, a current threshold is determined independently of input voltage. Accordingly, it is possible to decrease, in the PWM operating mode, occurrence of influence of the input voltage on the maximum output power when the current flowing through the switching element is near the maximum value of the current threshold, that is, at maximum output power. More specifically, when the maximum output power varies according to the input voltage, for example, excessive output power may be supplied to a load, resulting in a load failure. Here, it is possible to decrease that the maximum output power depends on the input voltage as described above. Specifically, it is possible to achieve a high-performance switching power supply apparatus.

Furthermore, it may be that when the output power is below a second threshold that is smaller than the first threshold, (i) the oscillating frequency setting unit sets the switching frequency to be constant regardless of a change in the output power, and (ii) the peak current setting unit sets the current threshold to decrease as the output power decreases.

With the configuration, when output power is below the second threshold that is smaller than the first threshold, that is, when the load condition is lighter than the light load at which the switching operation is controlled in the PFM operating mode, the switching operation is controlled in the PWM operating mode. Accordingly, when the switching frequency is low and noise of a transformer is in the audible frequency range, the switching operation is controlled in the PWM operating mode. As a result, it is possible to decrease the switch current peak. This reduces the noise of a transformer.

Furthermore, it may be that the peak current setting unit includes: a switch current peak setting unit which sets the current threshold to be constant regardless of changes in the output power and the input voltage, and to output a turn-off signal for turning off the switching element when the current detected by the switch current detecting unit reaches the current threshold; and a delay circuit which outputs the turn-off signal with a delay of a predetermined period such that the switch current peak increases as the input voltage increases, and that the switching control unit turns off the switching element upon receipt of the turn-off signal output from the delay circuit.

With the configuration, the delay circuit which delays a turn-off signal for a predetermined period (delay period) is included. This allows the switch current peak to increase as input voltage increase, in the PFM operating mode in which the switch current peak is constant relative to the output power. This is because the ratio of increase in the current flowing through the switching element increases as the input voltage increases, and the current flowing through the switching element increases as the input voltage increases during the above delay period. Accordingly, it is possible to increase the power efficiency at high input voltage. Furthermore, since the delay circuit is simply added, it is possible to simplify the circuit configuration compared to the configuration which includes the input voltage detecting unit.

Furthermore, it may be that when the output power is above a first threshold, (i) the oscillating frequency setting unit sets the switching frequency to be constant regardless of a change in the output power, and (ii) the switch current peak setting unit sets the current threshold to increase as the output power increases, and when the output power is below the first threshold, (i) the oscillating frequency setting unit sets the switching frequency to decrease as the output power decreases, and (ii) the switch current peak setting unit sets the current threshold to be constant regardless of changes in the output power and the input voltage.

With the configuration, when output power is above the first threshold, that is, at a heavy load, switching operation is controlled in the PWM operating mode, and when the output power is below the first threshold, that is, at a light load, the switching operation is controlled in the PFM operating mode. Accordingly, it is possible to increase the power efficiency across the entire output power range (entire load range) at high input voltage. In particular, it is possible to decrease the loss caused by the switching operation at high input voltage and at a light load which is significantly influenced by the loss caused by the switching operation.

Furthermore, it may be that the delay circuit outputs the turn-off signal without applying a delay when the output power is above the first threshold, and outputs the turn-off signal with a delay of the predetermined period when the output power is below the first threshold.

With the configuration, in the PWM operating mode, a current threshold is determined independently of the input voltage. Accordingly, in the PWM operating mode, it is possible to decrease occurrence of influences of the input voltage on the maximum output power, when the current flowing through the switching element is near the maximum value of the current threshold, that is, when the output power is maximum. More specifically, when the maximum output power varies according to the input voltage, for example, excessive output power may be supplied to a load, resulting in a load failure. Here, it is possible to decrease that the maximum output power depends on the input voltage as described above. Specifically, it is possible to achieve a high-performance switching power supply apparatus.

Furthermore, it may be that when the output power is below a second threshold that is smaller than the first threshold, (i) the oscillating frequency setting unit sets the switching frequency to be constant regardless of a change in the output power, and (ii) the switch current peak setting unit sets the current threshold to decrease as the output power decreases.

Furthermore, it may be that when the output power is below the second threshold, the delay circuit applies, to the turn-off signal, a delay which decreases as the output power decreases.

With the configuration, when output power is below the second threshold that is smaller than the first threshold, that is, when the load condition is lighter than the light load condition at which the switching operation is controlled in the PFM operating mode, the switching operation is controlled in the PWM operating mode. Accordingly, when the switching frequency is low and noise of a transformer is in the audible frequency range, the switching operation is controlled in the PWM operating mode. As a result, it is possible to decrease the switch current peak. This reduces the noise of a transformer.

Furthermore, the present disclosure can also be implemented as a semiconductor device used in the switching power supply apparatus. More specifically, a semiconductor device according to one aspect of the present disclosure is a semiconductor device which switches a switching element on and off to convert an input voltage into an output voltage and supply output power to a load. The semiconductor device includes: a feedback adjusting unit which outputs a feedback signal, based on the output voltage; a switch current detecting unit which detects a current flowing through the switching element; an oscillating frequency setting unit which sets a switching frequency of the switching element, based on the feedback signal; a peak current setting unit which sets a current threshold to control turn-off of the switching element, based on a result of the detection by the switch current detecting unit and the current threshold, the current threshold being set such that a switch current peak is constant regardless of a change in the output power and increases as the input voltage increases, the switch current peak being a maximum value of the current flowing through the switching element; and a switching control unit which controls a switching operation of the switching element, based on results of the setting by the oscillating frequency setting unit and by the peak current setting unit.

With the configuration, in the PFM operating mode in which the switch current peak is constant relative to output power, a current threshold is set so that the switch current peak increases as the input voltage increases. When the switch current peak increases, the switching frequency decreases to maintain the output power constant. When the oscillating frequency decreases, the number of switching operations in a predetermined period decreases. Hence, a loss caused by the switching operation in the predetermined period decreases. Accordingly, since the loss cause by the switching operation decreases at high input voltage, it is possible to increase the power efficiency at high input voltage.

Advantageous Effects

The switching power supply apparatus and the semiconductor device according to the present disclosure are capable of increasing the power efficiency at high input voltage.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

Figure 1:
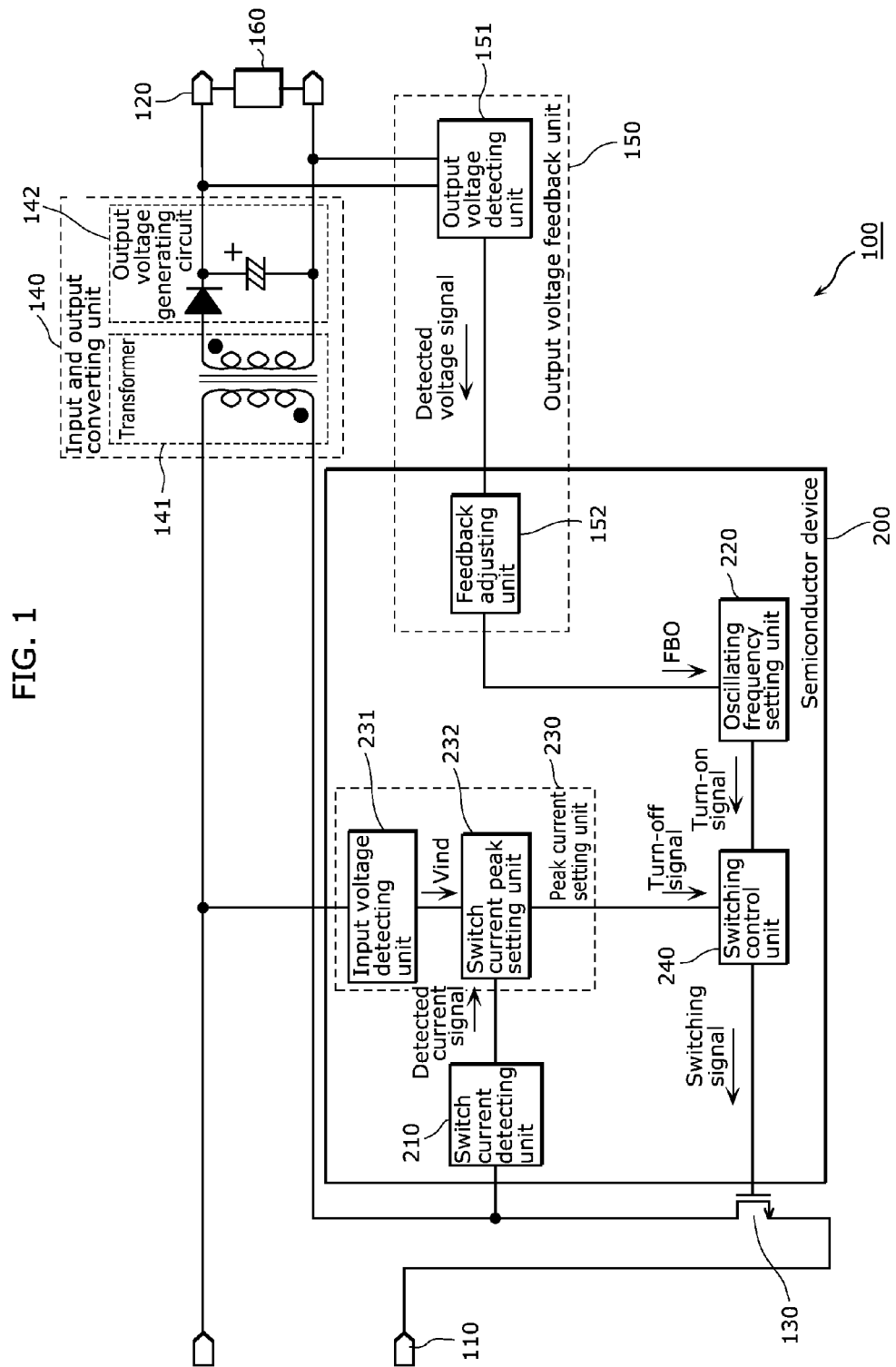
FIG. 1 is a circuit diagram showing an example of a configuration of a switching power supply apparatus according to Embodiment 1.

Hereinafter, referring to the accompanying Drawings, descriptions are given of a switching power supply apparatus and a semiconductor device according to embodiments of the present disclosure.

Embodiment 1

A switching power supply apparatus according to Embodiment 1 of the present disclosure is a constant-voltage power supply and includes: an input terminal; an output terminal; a switching element connected to the input terminal; an input and output converting unit which converts, into output voltage, input voltage input to the input terminal and applied through the switching element, to supply output power to a load connected to the output terminal; and a semiconductor device which controls switching operation of the switching element. The semiconductor device includes: an output voltage feedback unit which outputs a feedback signal, based on the output voltage; a switch current detecting unit which detects current flowing through the switching element; an oscillating frequency setting unit which sets (adjusts) the switching frequency of the switching element, based on the feedback signal; a peak current setting unit which controls turn-off of the switching element, based on the detection result by the switch current detecting unit and a current threshold; and a switching control unit which controls the switching operation of the switching element, based on the control results by the oscillating frequency setting unit and the peak current setting unit.

The peak current setting unit according to Embodiment 1 sets, in a predetermined case, a current threshold such that a switch current peak (i) is constant relative to output power and (ii) increases as input voltage increases. The switch current peak is a maximum value of current flowing through a switching element. More specifically, the peak current setting unit according to Embodiment 1 includes: an input voltage detecting unit which detects input voltage; and a switch current peak setting unit which sets a current threshold to be constant relative to the output power and to increase as the input voltage detected by the input voltage detecting unit increases.

The switching power supply apparatus according to Embodiment 1 controls the switching operation of the switching element in a PFM operating mode in the entire load range. More specifically, the switching power supply apparatus according to Embodiment 1 controls the switching operation in the PFM operating mode, regardless of the load condition (light or heavy), that is, regardless of the magnitude of the output power.

Here, the PFM operating mode refers to an operating mode in which the oscillating frequency is set according to the output power while maintaining the maximum value of the current flowing through the switching element constant relative to the load condition (output power).

Furthermore, in the switching power supply apparatus according to Embodiment 1 and other embodiments, in the PFM operating mode, the switching operation is controlled not based on the Ton control scheme in which on-period of the switching element is controlled, but based on the Idp control scheme in which the value of current flowing through the switching element is used as a reference, that is a current threshold is set.

FIG. 1 is a circuit diagram showing an example of a configuration of a switching power supply apparatus 100 according to Embodiment 1. The switching power supply apparatus 100 shown in FIG. 1 includes an input terminal 110, an output terminal 120, a switching element 130, an input and output converting unit 140, an output voltage feedback unit 150, and a semiconductor device 200.

The input terminal 110 is a terminal for receiving input voltage. More specifically, the input terminal 110 receives DC input voltage. The DC input voltage is, for example, generated by a rectification smoothing circuit (not shown) rectifying and smoothing AC commercial power. The AC commercial power is, for example, AC 100 V or AC 240 V.

The output terminal 120 is a terminal for externally outputting output voltage generated by the input and output converting unit 140. When a load 160 is connected to the output terminal 120 as shown in FIG. 1, output power is supplied to the load 160 by the output voltage generated at the output terminal 120 causing current to flow through the load 160.

The switching element 130 is connected to the input terminal 110. For example, the switching element 130 is a metal oxide semiconductor (MOS) transistor. The switching element 130 implements switching of input voltage input to the input terminal 110, to adjust output power to be supplied to the load 160. The switching operation of the switching element 130, that is, switching on and off of the switching element 130 is performed based on a switching signal output from the semiconductor device 200.

The input and output converting unit 140 converts, into output voltage, the input voltage input to the input terminal 110 and applied through the switching element 130, to supply output power to the load 160 connected to the output terminal 120. As shown in FIG. 1, the input and output converting unit 140 includes a transformer 141 and an output voltage generating circuit 142.

The transformer 141 is an example of a transformer, and converts input voltage (primary side AC voltage) applied through the switching element 130 into secondary side AC voltage by using electromagnetic induction. In other words, the transformer 141 is an example of an energy transferring element, and transfers power from the input terminal 110 side to the output terminal 120 side. More specifically, the transformer 141 includes a primary winding and a secondary winding, and converts the primary side AC voltage input to the primary winding into a secondary side AC voltage generated at the secondary winding, by using electromagnetic induction generated between the primary winding and the secondary winding.

The output voltage generating circuit 142 is an example of a rectification smoothing circuit, and generates output voltage. More specifically, the output voltage generating circuit 142 generates DC output voltage by rectifying and smoothing the secondary side AC voltage generated at the secondary winding of the transformer 141, and generates the output voltage at the output terminal 120. For example, the output voltage generating circuit 142 includes a diode and a capacitor, as shown in FIG. 1.

The output voltage feedback unit 150 detects output voltage, and outputs a feedback signal FBO corresponding to the detected output voltage. As shown in FIG. 1, the output voltage feedback unit 150 includes an output voltage detecting unit 151 and a feedback adjusting unit 152.

The output voltage detecting unit 151 detects the output voltage generated at the output terminal 120. The output voltage detecting unit 151 then outputs, to the feedback adjusting unit 152, a detected voltage signal indicating the value of the detected output voltage.

The output voltage detected by the output voltage detecting unit 151 indicates the condition of the load 160 connected to the output terminal 120. More specifically, high output voltage indicates low output power, that is, indicates that the condition of the load 160 has turned into a light load. Low output voltage indicates high output power, that is, indicates that the condition of the load 160 has turned into a heavy load.

The feedback adjusting unit 152 outputs a feedback signal FBO corresponding to the detected voltage signal. More specifically, the feedback adjusting unit 152 outputs a feedback signal FBO that is a signal corresponding to the value of the output voltage, that is, a feedback signal FBO having a positive correlation with the value of the output voltage. For example, the voltage value of the feedback signal FBO increases as the value of the output voltage increases.

In this case, the feedback adjusting unit 152 outputs a feedback signal FBO having a voltage value which increases as the output voltage increases, that is, as the output power decreases. Furthermore, the feedback adjusting unit 152 outputs a feedback signal FBO having a voltage value which decreases as the output voltage decreases, that is, as the output power increases.

The switching power supply apparatus 100 is a constant-voltage output power supply. The output voltage of the switching power supply apparatus 100 is kept almost constant by the controls performed by the internal elements (the switching element 130, the output voltage feedback unit 150, the oscillating frequency setting unit 220, and the switching control unit 240). The output voltage feedback unit 150 varies the feedback signal FBO according to the slight change in the output voltage, and eventually varies the power supplied from the switching power supply apparatus 100 to the output terminal 120 while keeping the output voltage constant. As a result, the output voltage is almost constant even when the condition (light or heavy) of the load 160 is different.

Furthermore, the feedback adjusting unit 152 may output a feedback signal FBO having a negative correlation with the value of the output voltage. For example, it may be that the feedback signal FBO have a voltage value which decreases as the value of the output voltage increases. In this case, the magnitude relationship may be inversed when the voltage value of the feedback signal FBO is compared with a threshold, as described below. In Embodiment 1 and the following embodiments, descriptions are given of the case where the feedback signal FBO has a positive correlation with the value of the output voltage.

The feedback adjusting unit 152 is included in the semiconductor device 200 as shown in FIG. 1.

The semiconductor device 200 implements switching of the switching element 130 to convert input voltage to output voltage and supply output power to the load 160. In other words, the semiconductor device 200 controls the switching operation of the switching element 130.

As shown in FIG. 1, the semiconductor device 200 includes the feedback adjusting unit 152, a switch current detecting unit 210, an oscillating frequency setting unit 220, a peak current setting unit 230, and a switching control unit 240.

The switch current detecting unit 210 detects current flowing through the switching element 130. In other words, the switch current detecting unit 210 detects the current flowing through the primary winding of the transformer 141 (primary current). Subsequently, the switch current detecting unit 210 outputs, to the peak current setting unit 230, a detected current signal indicating the value of the detected primary current.

Figure 2A:
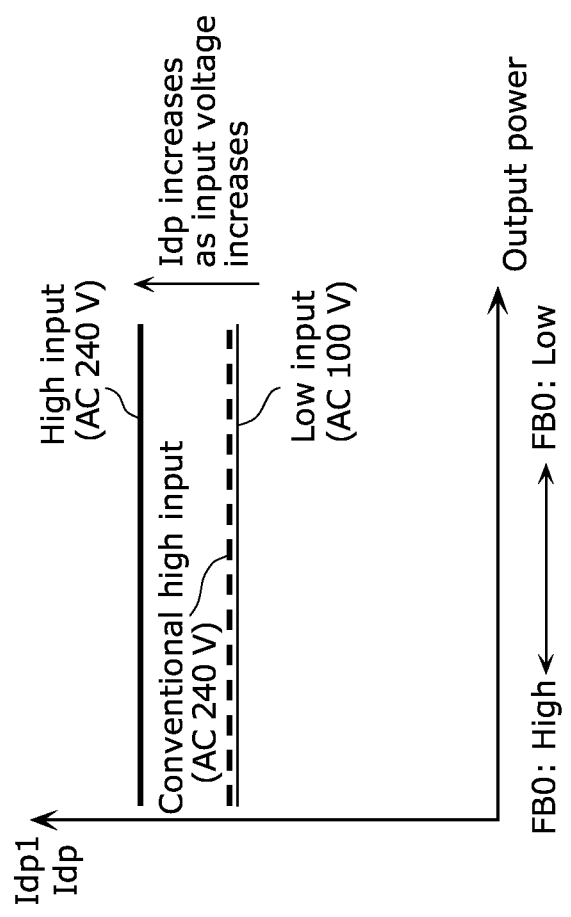
FIG. 2A is a diagram showing an example of setting of a current threshold according to Embodiment 1.
Figure 2B:
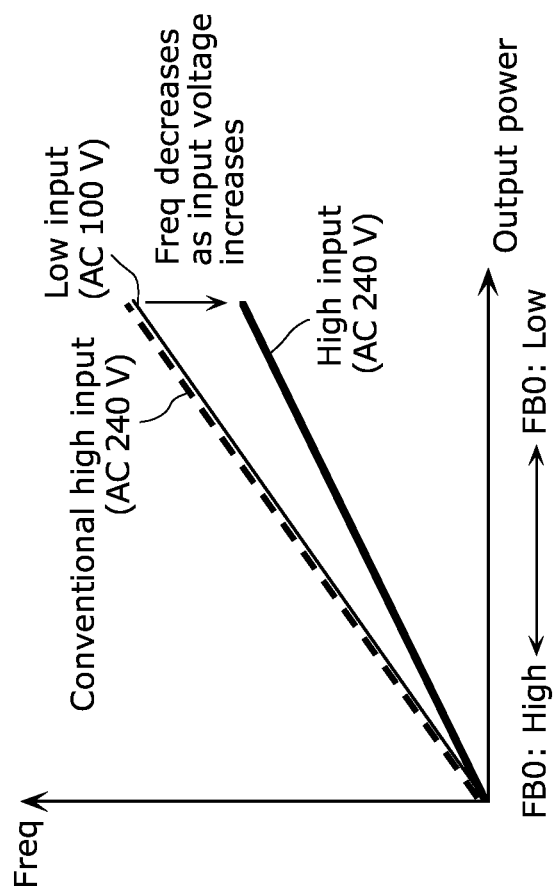
FIG. 2B is a diagram showing an example of setting of oscillating frequency according to Embodiment 1.

The oscillating frequency setting unit 220 sets the switching frequency of the switching element 130, based on the feedback signal FBO. In other words, the oscillating frequency setting unit 220 sets the switching frequency Freq of the switching element 130, according to the condition of the load 160 connected to the output terminal 120. More specifically, the oscillating frequency setting unit 220 sets, based on the feedback signal FBO, the oscillating frequency Freq by varying the time when the switching element 130 is turned on. Referring to FIG. 2B, a description is given later of a specific example of setting of the oscillating frequency Freq that is an example of the switching frequency.

The oscillating frequency setting unit 220 further outputs a turn-on signal to the switching control unit 240, based on the oscillating frequency Freq. The turn-on signal is a signal for turning on the switching element 130.

The peak current setting unit 230 sets, in a predetermined case, a current threshold Idp1 to control turn-off of the switching element 130, based on the detection result by the switch current detecting unit 210 and the current threshold Idp1. The current threshold Idp1 is set such that the switch current peak Idp (i) is constant relative to the output power and (ii) increases as the input voltage increases. The switch current peak Idp is a maximum value of the current flowing through the switching element 130.

Furthermore, the predetermined case refers to the case where the switching operation of the switching element 130 is performed in the PFM operating mode. In Embodiment 1, since the switching operation of the switching element 130 is performed in the PFM operating mode in the entire load range, the peak current setting unit 230 sets the current threshold Idp1 such that, in the entire load range, the switch current peak Idp (i) is constant relative to the output power and (ii) increases as the input voltage increases.

As shown in FIG. 1, the peak current setting unit 230 includes an input voltage detecting unit 231 and a switch current peak setting unit 232.

The input voltage detecting unit 231 detects input voltage. More specifically, the input voltage detecting unit 231 detects input voltage, and outputs, to the switch current peak setting unit 232, an input voltage signal Vind indicating the value of the detected input voltage.

The switch current peak setting unit 232 sets the current threshold Idp1 such that the current threshold Idp1 (i) is constant relative to the output power and (ii) increases as the input voltage detected by the input voltage detecting unit 231 increases. Referring to FIG. 2A, a description will be given later of a specific example of setting of the current threshold Idp1.

The switch current peak setting unit 232 further outputs a turn-off signal to the switching control unit 240 when the value of the current detected by the switch current detecting unit 210 reaches the current threshold Idp1. The turn-off signal is a signal for turning off the switching element 130.

The switching control unit 240 controls the switching operation of the switching element 130, based on the control results by the oscillating frequency setting unit 220 and the peak current setting unit 230. More specifically, the switching control unit 240 turns on the switching element 130 upon receipt of the turn-on signal from the oscillating frequency setting unit 220. Furthermore, the switching control unit 240 turns off the switching element 130 upon receipt of the turn-off signal from the peak current setting unit 230.

The switching control unit 240 controls turn-on and turn-off of the switching element 130, that is, the switching operation of the switching element 130, by outputting a switching signal. The switching operation of the switching element 130 may be controlled by any methods.

For example, when the switching element 130 is switched on and off each time the switching element 130 receives pulse, the switching control unit 240 may output a pulse signal as a switching signal when a turn-on signal or a turn-off signal is input. Another example is that, when the switching element 130 is on while a high-level signal is input and is off while a low-level signal is input, the switching control unit 240 may output a high-level signal when a turn-on signal is input, and output a low-level signal when a turn-off signal is input.

Subsequently, a description is given of the operation of the switching power supply apparatus 100 according to Embodiment 1. More specifically, a description is given of an example of control of the switching operation of the switching element 130.

FIG. 2A is a diagram showing an example of setting of the current threshold Idp1 according to Embodiment 1. In FIG. 2A, the horizontal axis represents output power Po, and the vertical axis represents the current threshold Idp1. As described above, the feedback signal FBO varies according to the condition of the load 160, that is, output power. More specifically, the feedback signal FBO decreases as the output power Po increases.

As shown in FIG. 2A, the current threshold Idp1 is constant relative to the output power. On the other hand, the current threshold Idp1 increases as the input voltage increases. More specifically, as shown in FIG. 2A, the current threshold Idp1 at the input voltage of AC 240 V is higher than the current threshold Idp1 at the input voltage of AC 100 V. The input voltage of AC 100 V means that DC voltage generated by rectifying and smoothing AC 100 V is input as input voltage.

In Embodiment 1, the switch current peak setting unit 232 outputs a turn-off signal when the current flowing through the switching element 130 reaches the current threshold Idp1, and the switching control unit 240 turns off the switching element 130 when the turn-off signal is input. More specifically, the switch current peak Idp that is a maximum value of the current flowing through the switching element 130 matches the current threshold Idp1.

Accordingly, the switch current peak setting unit 232 sets the current threshold Idp1 to be constant relative to the output power and to increase as the input voltage increases. This results in the switch current peak Idp which is constant relative to the output power and which increases as the input voltage increases.

FIG. 2B is a diagram showing an example of setting of oscillating frequency Freq according to Embodiment 1. In FIG. 2B, the horizontal axis represents output power Po, and the vertical axis represents oscillating frequency Freq. As described above, the feedback signal FBO varies according to the condition of the load 160, that is, output power. More specifically, the feedback signal FBO decreases as the output power Po increases.

As shown in FIG. 2A, the switch current peak Idp increases as the input voltage increases. Here, the output power Po in a non-continuous mode is expressed by (Equation 1).

$$Po = (1/2) \times Lp \times Idp^2 \times Freq \times \eta \quad \text{(Equation 1)}$$

Here, Lp represents inductance of the primary winding, and η represents power efficiency. As shown in (Equation 1), the output power Po increases as the switch current peak Idp increases. Hence, when the output power is constant, if the switch current peak Idp increases as the input voltage increases, then the oscillating frequency Freq needs to decrease. In Embodiment 1, the switch current peak Idp is kept constant relative to the output power Po, and the switch current peak Idp increases as the input voltage increases. Hence, it is necessary to decrease the oscillating frequency Freq to keep the output power Po constant.

Hence, as shown in FIG. 2B, the oscillating frequency setting unit 220 sets, according to the feedback signal FBO, the oscillating frequency Freq to decrease as the input voltage increases. More specifically, the oscillating frequency Freq at the input voltage of AC 240 V is lower than the oscillating frequency Freq at the input voltage of AC 100 V.

In the conventional PFM operating mode, as shown in FIG. 2A, the switch current peak Idp is constant relative to the input voltage, too. Hence, in the conventional PFM operating mode, as shown in FIG. 2B, the oscillating frequency Freq is constant relative to the input voltage and depends only on the output power.

Figure 3:
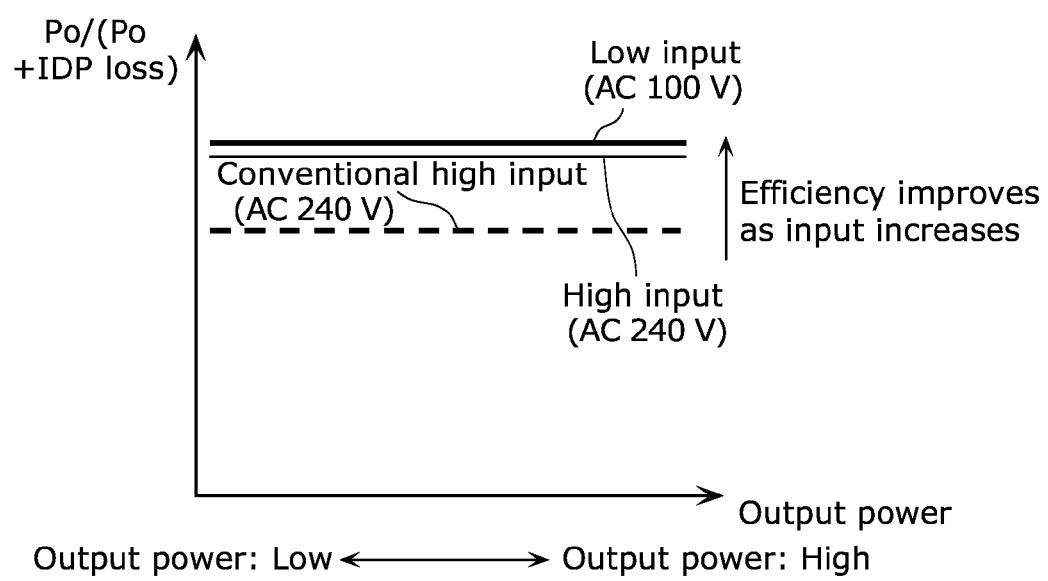
FIG. 3 is a diagram illustrating effects of the switching power supply apparatus according to Embodiment 1.

FIG. 3 is a diagram illustrating effects of the switching power supply apparatus 100 according to Embodiment 1. In FIG. 3, the horizontal axis represents output power Po, and the horizontal axis represents simplified power efficiency. As described above, the feedback signal FBO varies according to the condition of the load 160, that is, output power. Furthermore, the simplified power efficiency is represented by output power Po/(output power Po+loss in switching element).

As shown in FIG. 3, at high input voltage (for example, input voltage of AC 240 V), power efficiency increases compared to the conventional method. More specifically, in the PFM operating mode, when the switch current peak Idp increases as the input voltage increases, power efficiency increases compared to the case where the switch current peak Idp is constant relative to the input voltage. This is due to the following reasons.

Losses in the switching element 130 include loss caused by the switching operation of the switching element 130 and loss caused by on-resistance. At high input voltage, the influences from the loss caused by the switching operation is larger than the loss caused by the on-resistance. The loss caused by the on-resistance is loss caused while the source-drain voltage is almost zero, and the loss is not greatly influenced by the input voltage. On the other hand, the loss caused by the switching operation is expressed by a product of the current flowing through the switching element 130 during the switching operation and the source-drain voltage. Since the source-drain voltage is proportional to the input voltage, the loss caused by the switching operation increases as the input voltage increases.

Here, the loss caused by the switching operation increases in proportion to the number of switching operations of the switching element 130. More specifically, the loss caused by the switching operation increases in proportion to the oscillating frequency. In Embodiment 1, as described above, the oscillating frequency Freq decreases by increasing the switch current peak Idp. Accordingly, it is possible to reduce the loss caused by the switching operation, and to increase the power efficiency compared to the conventional method.

As described above, the switching power supply apparatus 100 according to Embodiment 1 sets the current threshold Idp1 such that the switch current peak Idp increases as the input voltage increases, in the PFM operating mode in which the switch current peak Idp is constant relative to the output power. In other words, the switching power supply apparatus 100 varies the switch current peak Idp relative to the input voltage. When the current flowing through the switching element 130 reaches the current threshold Idp1, the switching element 130 is turned off.

When the switch current peak increases, the oscillating frequency Freq decreases to keep the output power constant. When the oscillating frequency Freq decreases, the number of switching operations in a predetermined period decreases. Hence, the loss caused by the switching operation in the predetermined period decreases. Accordingly, in the PFM operating mode, since the loss cause by the switching operation decreases at high input voltage, it is possible to increase the power efficiency at high input voltage.

In such a manner, according to the switching power supply apparatus 100 in Embodiment 1, the power efficiency can be improved when the switching operation is controlled in a single operating mode (specifically, PFM operating mode). In other words, the switching power supply apparatus 100 is capable of increasing the power efficiency without switching operating modes.

Furthermore, the switching power supply apparatus 100 according to Embodiment 1 includes: the input voltage detecting unit 231 which detects input voltage; and the switch current peak setting unit 232 which sets the current threshold Idp1 to increase as the input voltage detected by the input voltage detecting unit 231 increases.

By including the input voltage detecting unit 231, it is possible to increase the design flexibility in the circuit configuration of the switching power supply apparatus 100.

Embodiment 2

In the switching power supply apparatus according to Embodiment 2, the peak current setting unit includes: a switch current peak setting unit which sets a current threshold to be constant relative to the output power and the input voltage, and outputs a turn-off signal for turning off the switching element when the current detected by the switch current detecting unit reaches the current threshold; and a delay circuit which outputs the turn-off signal with a delay of a predetermined period such that the switch current peak increases as the input voltage increases. The switching control unit turns off the switching element upon receipt of the turn-off signal output from the delay circuit.

Furthermore, the switching power supply apparatus according to Embodiment 2 controls the switching operation of the switching element in the PWM operating mode at a heavy load, and in the PFM operating mode at a light load. Here, the PWM operating mode refers to an operating mode in which the maximum value of the current flowing through the switching element is controlled according to the output power while keeping the oscillating frequency constant relative to the load condition (output power).

More specifically, (i) when the output power is above a first threshold, that is, in the case of the PWM operating mode, the oscillating frequency setting unit sets the switching frequency to be constant relative to the output power, and the switch current peak setting unit sets the current threshold to increase as the output power increases. When (ii) the output power is below the first threshold, that is, in the case of the PFM operating mode, the oscillating frequency setting unit sets the switching frequency to decrease as the output power decreases, and the switch current peak setting unit sets a current threshold to be constant relative to the output power and the input voltage. As described above, the first threshold corresponds to the switching point between the PWM operating mode and the PFM operating mode.

Figure 4:
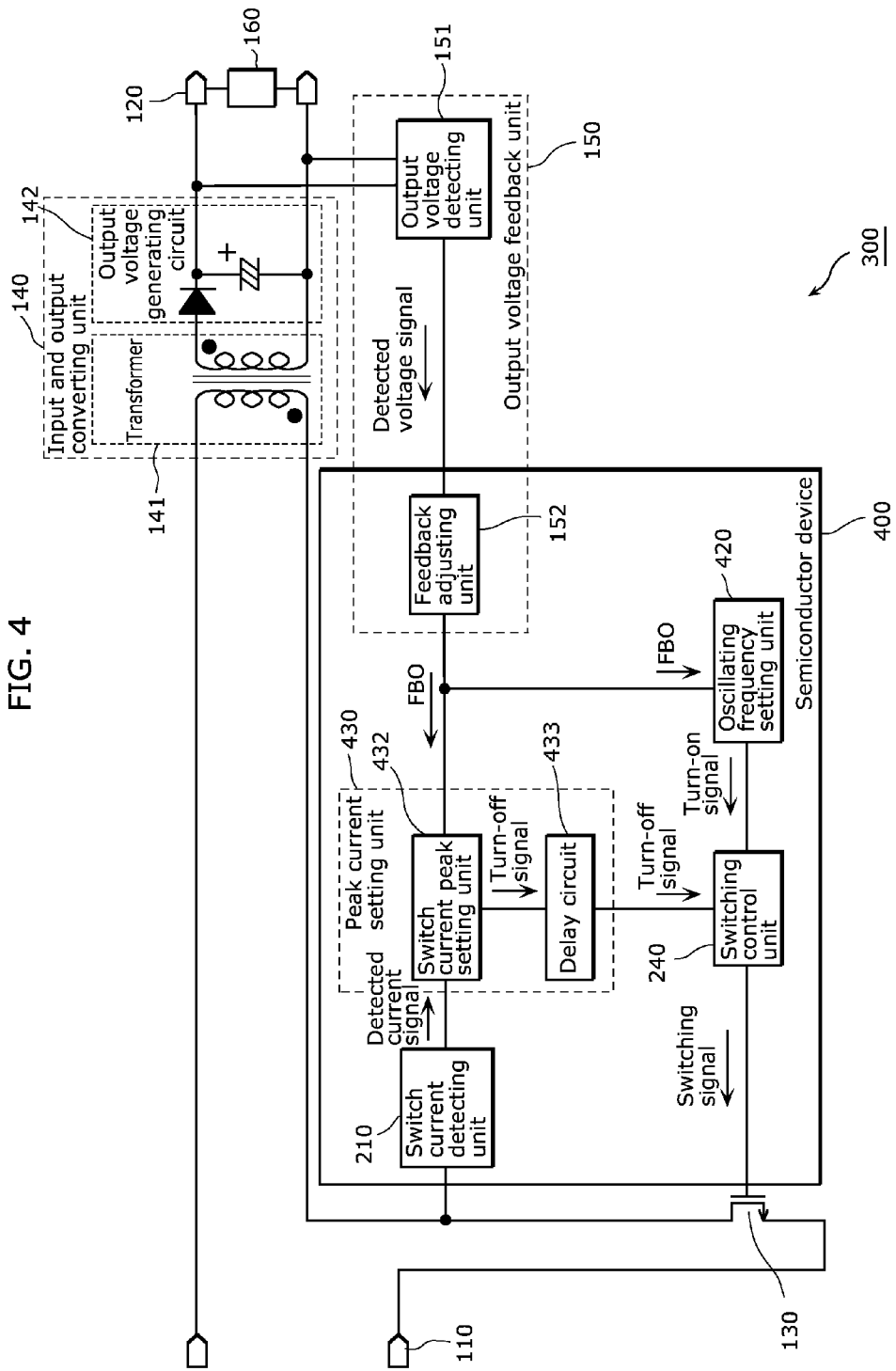
FIG. 4 is a circuit diagram showing an example of a configuration of a switching power supply apparatus according to Embodiment 2.

FIG. 4 is a circuit diagram showing an example of a configuration of a switching power supply apparatus 300 according to Embodiment 2. The switching power supply apparatus 300 according to Embodiment 2 shown in FIG. 4 is different from the switching power supply apparatus 100 according to Embodiment 1 shown in FIG. 1 in that a semiconductor device 400 is included instead of the semiconductor device 200. In the following description, the constituent elements substantially same as those in Embodiment 1 are assigned with the same referential numerals, and their descriptions are omitted. Descriptions are mainly given of the points different from Embodiment 1.

The semiconductor device 400 is different from the semiconductor device 200 shown in FIG. 1 in that an oscillating frequency setting unit 420 and a peak current setting unit 430 are included instead of the oscillating frequency setting unit 220 and the peak current setting unit 230.

The oscillating frequency setting unit 420 sets the switching frequency of the switching element 130, based on a feedback signal FBO. More specifically, the oscillating frequency setting unit 420 sets the switching frequency Freq of the switching element 130, according to the condition of the load 160 connected to the output terminal 120. Furthermore, the oscillating frequency setting unit 420 sets the switching frequency to be constant relative to the output power (generates a turn-on signal such that the switching frequency is constant relative to the output power), when the feedback signal FBO is below a threshold FB1 (when the output power is above the first threshold), and sets the switching frequency to decrease as the output power decreases (generates a turn-on signal such that the switching frequency decreases as the output power decreases), when the feedback signal FBO is above the threshold FB1 (when the output power is below the first threshold).

The case where the feedback signal FBO is below the threshold corresponds to the case where the feedback signal FBO departs from the threshold in the direction of increase of the output power. In the similar manner, the case where the feedback signal FBO is above the threshold corresponds to the case where the feedback signal FBO departs from the threshold in the direction of decrease of the output power.

In other words, the oscillating frequency setting unit 420 sets the switching frequency such that the operating mode changes from the PWM operating mode to the PFM operating mode as the output power decreases.

Figure 6A:
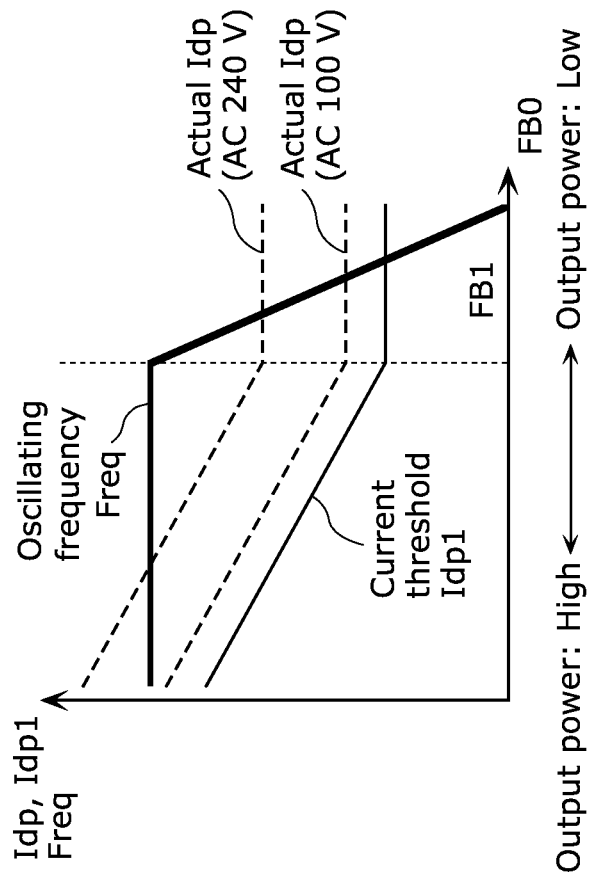
FIG. 6A is a diagram showing an example of setting of a current threshold, a switch current peak, and oscillating frequency according to Embodiment 2.
Figure 6B:
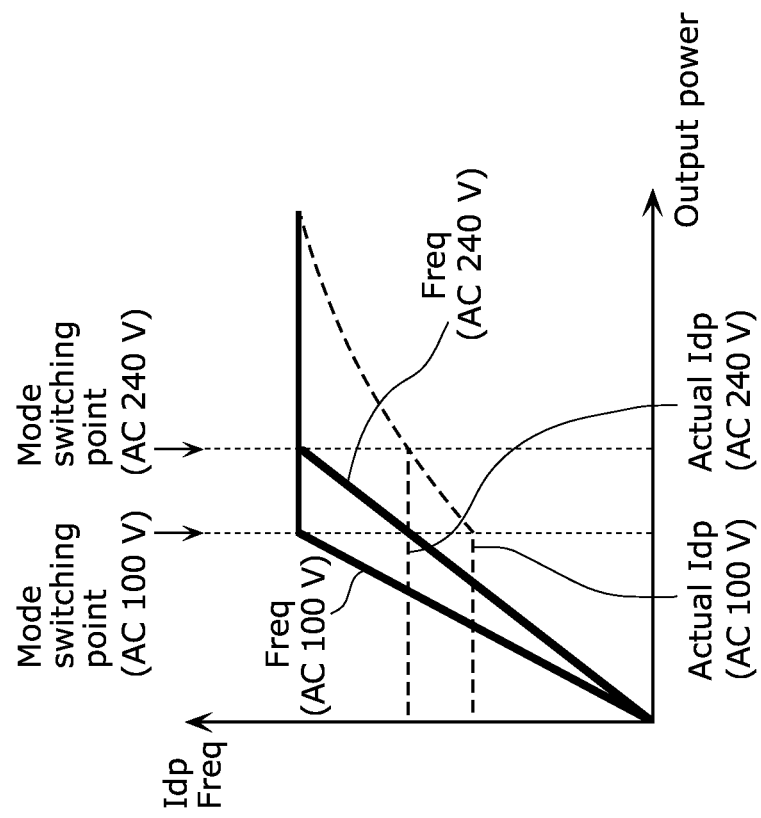
FIG. 6B is a diagram showing an example of setting of a current threshold, a switch current peak, and oscillating frequency according to Embodiment 2.

More specifically, the oscillating frequency setting unit 420 sets, based on the feedback signal FBO, the oscillating frequency Freq by varying the time when the switching element 130 is turned on. Referring to FIG. 6A and FIG. 6B, a description is given later of a specific example of setting of the oscillating frequency Freq that is an example of the switching frequency.

The oscillating frequency setting unit 420 further outputs a turn-on signal to the switching control unit 240, based on the oscillating frequency Freq.

The peak current setting unit 430 (i) sets, in a predetermined case, the current threshold Idp1 such that the switch current peak Idp is constant relative to the output power, and (ii) provides a predetermined delay period between when the current (drain current) flowing through the switching element 130 reaches the current threshold Idp1 and when the switching element 130 actually turns off, such that the actual switch current peak Idp increases as the input voltage increases. Accordingly, the peak current setting unit 430 controls turn-off of the switching element 130, based on the detection result of the switch current detecting unit 210 and the current threshold Idp1. Furthermore, the predetermined case refers to the case where the switching operation of the switching element 130 is performed according to the PFM operating mode. As shown in FIG. 4, the peak current setting unit 430 includes a switch current peak setting unit 432 and a delay circuit 433.

The switch current peak setting unit 432 sets the current threshold Idp1 to increase as the output power increases, when the feedback signal FBO is below the threshold FB1. The switch current peak setting 432 sets the current threshold Idp1 to be constant relative to the output power and the input voltage, when the feedback signal FBO is above the threshold FB1. Subsequently, the switch current peak setting unit 432 outputs, to the delay circuit 433, a turn-off signal for turning off the switching element 130, when the current detected by the switch current detecting unit 210 reaches the current threshold Idp1.

More specifically, the switch current peak setting unit 432 sets the current threshold Idp1, based on the feedback signal FBO. Referring to FIG. 6A and FIG. 6B, a description will be given later of a specific example of setting of the current threshold Idp1.

The delay circuit 433 outputs a turn-off signal with a delay of a predetermined period such that the switch current peak Idp increases as the input voltage increases. Here, the predetermined period is a period fixed (invariable) relative to the input voltage, the switch current peak, the output voltage, the output power, and others. After the current flowing through the switching element 130 reaches the current threshold Idp1, the delay circuit 433 turns off the switching element 130 after a predetermined delay period Hence, the actual switch current peak Idp is a value greater than the current threshold Idp1, and is a value which varies according to the input voltage.

Figure 5:
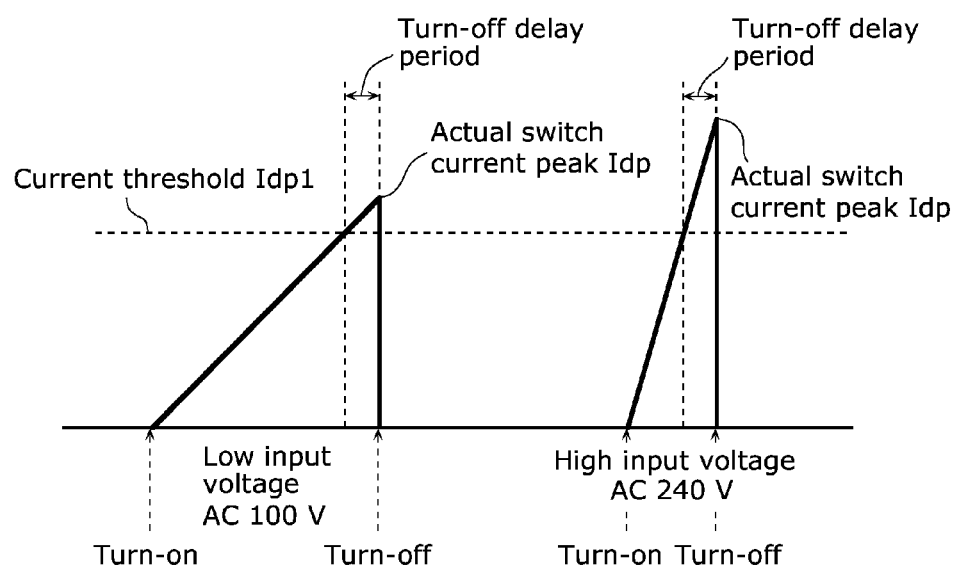
FIG. 5 is a diagram illustrating an example of an effect of a delay circuit according to Embodiment 2.

FIG. 5 is a diagram illustrating an example of an effect of the delay circuit 433 according to Embodiment 2.

As shown in FIG. 5, the current flowing through the switching element 130 gradually increases from when the switching element 130 turns on. The slope of the increase is proportional to the input voltage. Accordingly, the increase of the slope at high input voltage is steeper than that at low input voltage.

The switch current peak setting unit 432 outputs a turn-off signal to the delay circuit 433 when the current flowing through the switching element 130 reaches the current threshold Idp1. The delay circuit 433 delays the turn-off signal by a turn-off delay period that is a fixed period, and outputs the delayed turn-off signal to the switching control unit 240. Subsequently, the switching control unit 240 turns off the switching element 130 upon receipt of the turn-off signal output from the delay circuit 433.

Hence, as shown in FIG. 5, the current flowing through the switching element 130 keeps increasing during the period from when the current flowing through the switching element 130 reaches the current threshold Idp1 to when the switching element 130 actually turns off, that is, during the turn-off-delay-period. Accordingly, the switch current peak Idp is a value greater than the current threshold Idp1.

Here, as described above, the slope of the current flowing through the switching element 130 is proportional to the input voltage. Hence, as shown in FIG. 5, the switch current peak Idp at high input voltage is greater than the switch current peak Idp at low input voltage. In other words, by the delay circuit 433 outputting a turn-off signal with a delay of a fixed period, it is possible to increase the switch current peak as the input voltage increases. Accordingly, in the similar manner to Embodiment 1, in the PFM operating mode, the oscillating frequency at the same output power can be decreased. As a result, it is possible to decrease loss caused by the switching operation in the PFM operating mode, allowing an increase in the power efficiency.

Subsequently, a description is given of the operation of the switching power supply apparatus 300 according to Embodiment 2. More specifically, a description is given of an example of control of the switching operation of the switching element 130.

First, referring to FIG. 6A, a description is given of an example of control of the switching operation in the PWM operating mode and the PFM operating mode.

FIG. 6A is a diagram showing an example of setting of the current threshold Idp1, the switch current peak Idp, and the oscillating frequency Freq, according to Embodiment 2. In FIG. 6A, the horizontal axis represents the feedback signal FBO, and the vertical axis represents the current threshold Idp1, the switch current peak Idp, and the oscillating frequency Freq. As described above, the feedback signal FBO varies according to the condition of the load 160, that is, output power.

Here, the feedback signal FBO has a positive correlation with output voltage. More specifically, the output voltage increase as the voltage value of the feedback signal FBO increases. Furthermore, the output voltage decreases as the voltage value of the feedback signal FBO decreases.

The switching power supply apparatus 300 according to Embodiment 2 controls the switching operation of the switching element 130 in the PWM operating mode at a heavy load, that is, when the feedback signal FBO is below the threshold FB1. The switching power supply apparatus 300 according to Embodiment 2 controls the switching operation of the switching element 130 in the PFM operating mode at a light load, that is, when the feedback signal FBO is above the threshold FB1.

More specifically, the oscillating frequency setting unit 420 sets the oscillating frequency Freq to be constant relative to the output power, when the output power is above the first threshold. More specifically, the oscillating frequency setting unit 420 sets the oscillating frequency Freq to be constant relative to the voltage value of the feedback signal FBO, when the voltage value of the feedback signal is below the threshold FB1 as shown in FIG. 6A.

Furthermore, the oscillating frequency setting unit 420 sets the oscillating frequency Freq to decrease as the output power decreases, when the output power is below the first threshold. More specifically, the oscillating frequency setting unit 420 sets the oscillating frequency Freq to decrease as the voltage value of the feedback signal FBO increases as shown in FIG. 6A, when the voltage value of the feedback signal FBO is above the threshold FB1.

The switch current peak setting unit 432 sets the current threshold Idp1 to increase as the output power increases, when the output power is above the first threshold. More specifically, the switch current peak setting unit 432 sets the current threshold Idp1 to decrease as the voltage value of the feedback signal FBO increases, when the voltage value of the feedback signal FBO is below the threshold FB1, as shown in FIG. 6A.

Furthermore, the switch current peak setting unit 432 sets the current threshold Idp1 to be constant relative to the output power and the input voltage, when the output power is below the first threshold. More specifically, the switch current peak setting unit 432 sets the current threshold Idp1 to be constant relative to the voltage value of the feedback signal FBO and the input voltage, when the voltage value of the feedback signal FBO is above the threshold FB1, as shown in FIG. 6A.

Here, the peak current setting unit 430 according to Embodiment 2 includes the delay circuit 433. Accordingly, since the delay circuit 433 outputs a turn-off signal to the switching control unit 240 with a delay of a predetermined period, the actual switch current peak Idp varies according to the input voltage, as shown in FIG. 5. More specifically, as shown in FIG. 6A, the actual switch current peak Idp increases as the input voltage increases.

In Embodiment 2, the delay circuit 433 delays a turn-off signal in both the PWM operating mode and the PFM operating mode, that is, in the entire load range.

Next, referring to FIG. 6B, a description is given of an example of switching between the PWM operating mode and the PFM operating mode.

FIG. 6B is a diagram showing an example of setting of the current threshold Idp1, the switch current peak Idp, and the oscillating frequency Freq, according to Embodiment 2. In FIG. 6B, the horizontal axis represents output power, and the vertical axis represents the current threshold Idp1, the switch current peak Idp, and the oscillating frequency Freq. As described above, the feedback signal FBO varies according to the condition of the load 160, that is, output power.

Switching between the PWM operating mode and the PFM operating mode is performed based on the result of the comparison between the output power and the first threshold. More specifically, the switching between the PWM operating mode and the PFM operating mode is performed based on the result of the comparison between the voltage value of the feedback signal FBO and the threshold FB1. Here, the threshold FB1 is a predetermined value, and is a value fixed (invariable) relative to the input voltage, switch current peak, output voltage, output power, and others.

For example, it is assumed that the load 160 turns into a light load while controlling the switching operation in the PWM operating mode and output power decreases. When the output power decreases to the first threshold, that is, when the voltage value of the feedback signal FBO increases to the threshold FB1, the switch current peak Idp increases as the input voltage increases, as shown in FIG. 6A. When the switch current peak Idp is high, the output power is high as shown in (Equation 1).

More specifically, the actual output power when the output power decreases to the first threshold increases as the input voltage increases. More specifically, the first threshold, which is the output power at which the operation is switched between the PFM and PWM operations, varies according to the input voltage. In other words, as shown in FIG. 6B, the operating mode is switched from the PWM operating mode to the PFM operating mode at higher output power for higher input voltage. In addition, compared to the PFM operation in FIG. 6B, under the same conditions of the output power, the oscillating frequency Freq decreases as the input voltage increases.

The above also applies to the case where the load 160 turns into a heavy load while controlling the switching operation in the PFM operating mode and the output power increases. More specifically, when the output power increases to the first threshold, that is, when the voltage value of the feedback signal FBO decreases to the threshold FB1, as shown in FIG. 6A, the switch current peak Idp increases as the input voltage increases. When the switch current peak Idp is high, the output voltage is high as shown in (Equation 1).

More specifically, the actual output power when the output power increases to the first threshold increases as the input voltage increases. In other words, as shown in FIG. 6B, the operating mode is switched from the PFM operating mode to the PWM operating mode at higher output power for higher input voltage.

Subsequently, a description is given of the effects of the switching power supply apparatus 300 according to Embodiment 2.

Figure 7:
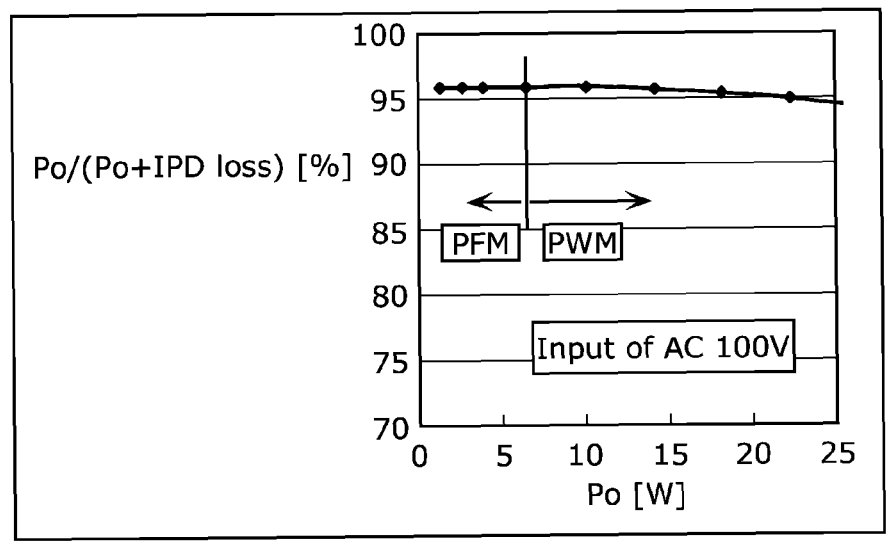
FIG. 7 is a diagram illustrating an example of effects at low input voltage in the switching power supply apparatus according to Embodiment 2.
Figure 7:
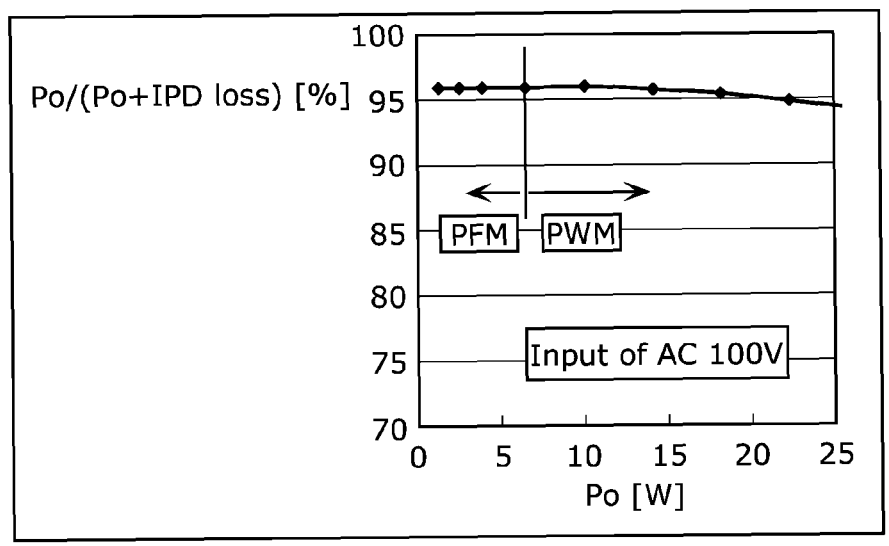
Figure 8:
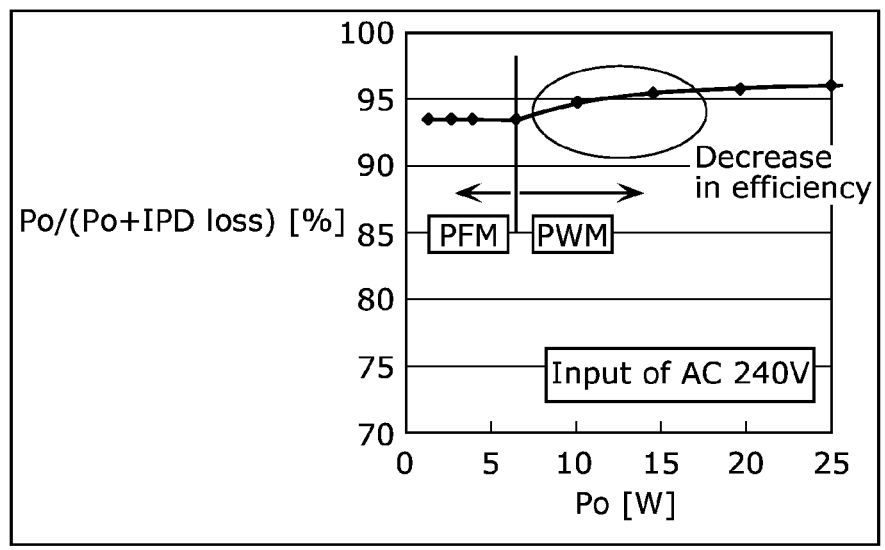
FIG. 8 is a diagram illustrating an example of effects at high input voltage in the switching power supply apparatus according to Embodiment 2.
Figure 8:
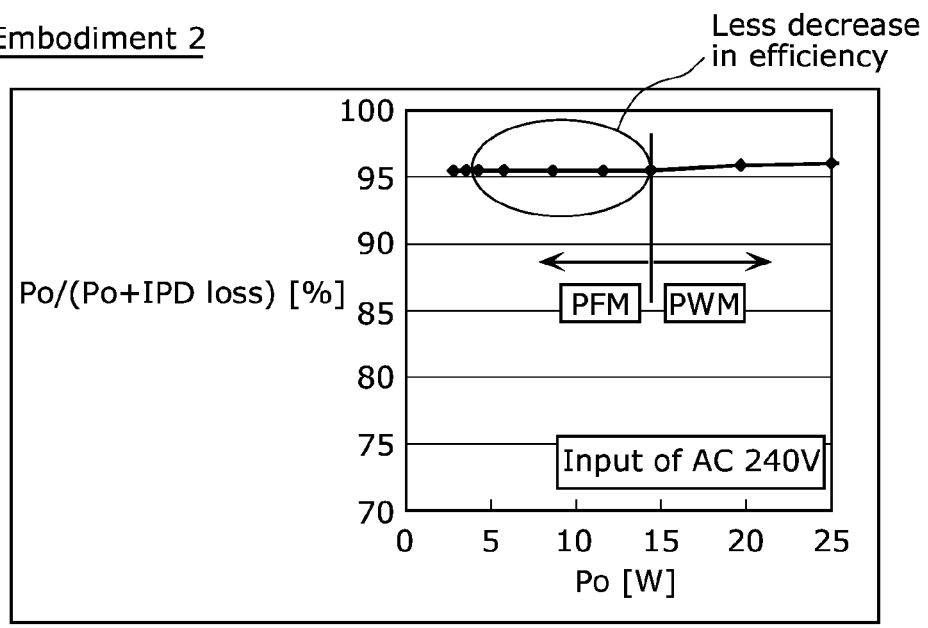

FIG. 7 and FIG. 8 are diagrams illustrating effects of the switching power supply apparatus 100 according to Embodiment 2. FIG. 7 shows simplified power efficiency at low input (AC 100 V). FIG. 8 shows simplified power efficiency at high input (AC 240 V).

In FIG. 7 and FIG. 8, the horizontal axes represent output power, and the horizontal axes represent simplified power efficiency. The simplified power efficiency is represented by output power Po/(output power Po+loss in switching element).

In FIG. 7 and FIG. 8, the "conventional technique" indicates the case where the switch current peak Idp is constant relative to the input voltage. More specifically, the "conventional technique" indicates the power efficiency when the delay circuit 433 is not included. In other words, in the "conventional technique", the time when the current flowing through the switching element 130 reaches the current threshold Idp1 matches the time when the switching element 130 is turned off. In contrast, "Embodiment 2" indicates the case where the switch current peak Idp increases as the input voltage increases. More specifically, "Embodiment 2" indicates the power efficiency when the delay circuit 433 is included.

As shown in FIG. 8, when the output power is low in the PWM operating mode, the power efficiency decreases as the output power decreases. This is because the ratio of loss caused by the switching operation to the output power increases at low output power.

In the PWM operating mode, the switch current peak Idp increases as the output power decreases. The loss caused by a single switching operation increases as the switch current peak Idp increases. In the PWM operating mode, the oscillating frequency Freq is constant; and thus, the number of the switching operations in a predetermined period is constant relative to the output power. Hence, at low output power, the ratio of loss caused by a single switching operation is higher than that at high output power; and thus, the ratio of the loss caused by the switching operation in a given period increases.

In contrast, in the PFM operation, the waveforms of the drain voltage and the drain current in a single oscillation do not vary, and only the oscillating frequency varies. Hence, the loss in the switching element 130 is proportional to the oscillating frequency. Furthermore, with the (Equation 1), the output power is also proportional to the oscillating frequency. Hence, the loss in the switching element 130 is proportional to the output voltage, and the ratio of the loss in the switching element 130 to the output power does not vary even when the output power varies. Accordingly, since the power efficiency does not vary according to the output power in the PFM operation, as shown in FIG. 8, it is possible to maintain the power efficiency at the time when the switching is performed from the PWM operating mode to the PFM operating mode. Hence, it is preferable to switch from the PWM operating mode into the PFM operating mode at the time when the power efficiency is sufficiently high.

Here, as shown in FIG. 7, at low input voltage, the switching point between the PFM operating mode and the PWM operating mode is almost the same between the "conventional technique" and "Embodiment 2". This is because, at low input voltage, influences from the delay circuit 433 is small, and the actual switch current peak Idp and the current threshold Idp1 are almost the same, as shown in FIG. 5.

In contrast, at high input voltage, the switching point between the PFM operating mode and the PWM operating mode in "Embodiment 2" is the time when output power is higher than that in the "conventional technique". This is because the PFM operation mode can be switched into the PWM operating mode at higher output power for higher input voltage, as described above.

As understood from the comparison between the "conventional technique" in FIG. 7 and the "conventional technique" in FIG. 8, the output power when the power efficiency approaches the maximum value is different. More specifically, as shown in FIG. 7, the output power when the power efficiency approaches the maximum value is higher at high input voltage than at low input voltage. Accordingly, as shown in "Embodiment 2", at high input voltage, it is preferable to switch from the PWM operating mode to the PFM operating mode at output power higher than that at low input voltage.

By including the delay circuit 433 in the switching power supply apparatus 300 according to Embodiment 2, it is possible to switch from the PWM operating mode into the PFM operating mode at higher output power for higher input voltage. Accordingly, as shown in FIG. 8, it is possible to suppress a decrease in the power efficiency at high input and light load (low output power).

As described above, the switching power supply apparatus 300 according to Embodiment 2 includes: the switch current peak setting unit 432 which sets the current threshold Idp1 to be constant relative to the output power and the input voltage, and outputs a turn-off signal when the current flowing through the switching element 130 reaches the current threshold Idp1; and the delay circuit 433 which delays the turn-off signal for a predetermined period (delay period).

More specifically, the delay circuit 433 delays the turn-off signal by a fixed delay period to vary the switch current peak Idp according to the input voltage. More specifically, the delay circuit 433 delays a turn-off signal by a fixed delay period such that the switch current peak Idp increases as the input voltage increases. This is because the ratio of increase of the current flowing through the switching element 130 increases as the input voltage increases, and the current flowing through the switching element 130 increases as the input voltage increases in the delay period.

Accordingly, in the PFM operating mode in which the switch current peak Idp is constant relative to the output power, it is possible to increase the switch current peak Idp as the input voltage increases. Hence, in the similar manner to Embodiment 1, in the PFM operating mode, it is possible to increase the power efficiency at high input voltage.

Furthermore, the switching power supply apparatus 300 according to Embodiment 2 controls the switching operation in the PWM operating mode when the feedback signal FBO is below the threshold FB1, that is, at a heavy load, and controls the switching operation in the PFM operating mode when the feedback signal FBO is above the threshold FB1, that is, at a light load.

Accordingly, it is possible to increase the power efficiency at high input voltage in the entire output power range (entire load range). In particular, it is possible to decrease the loss caused by the switching operation at high input voltage and at a light load which is significantly influenced by the loss caused by the switching operation.

Furthermore, since delay circuit is simply added to the switching power supply apparatus 300 according to Embodiment 2, the circuit configuration can be simplified compared to the configuration with the input voltage detecting unit.

In Embodiment 2, a description has been given of a mechanism of delaying a turn-off signal both in the PWM operating mode and the PFM operating mode, that is, in the entire load range. In contrast, as in Variation of Embodiment 2 below, it may be that a turn-off signal is not delayed in the PWM operating mode, but is delayed only in the PFM operating mode.

Figure 9:
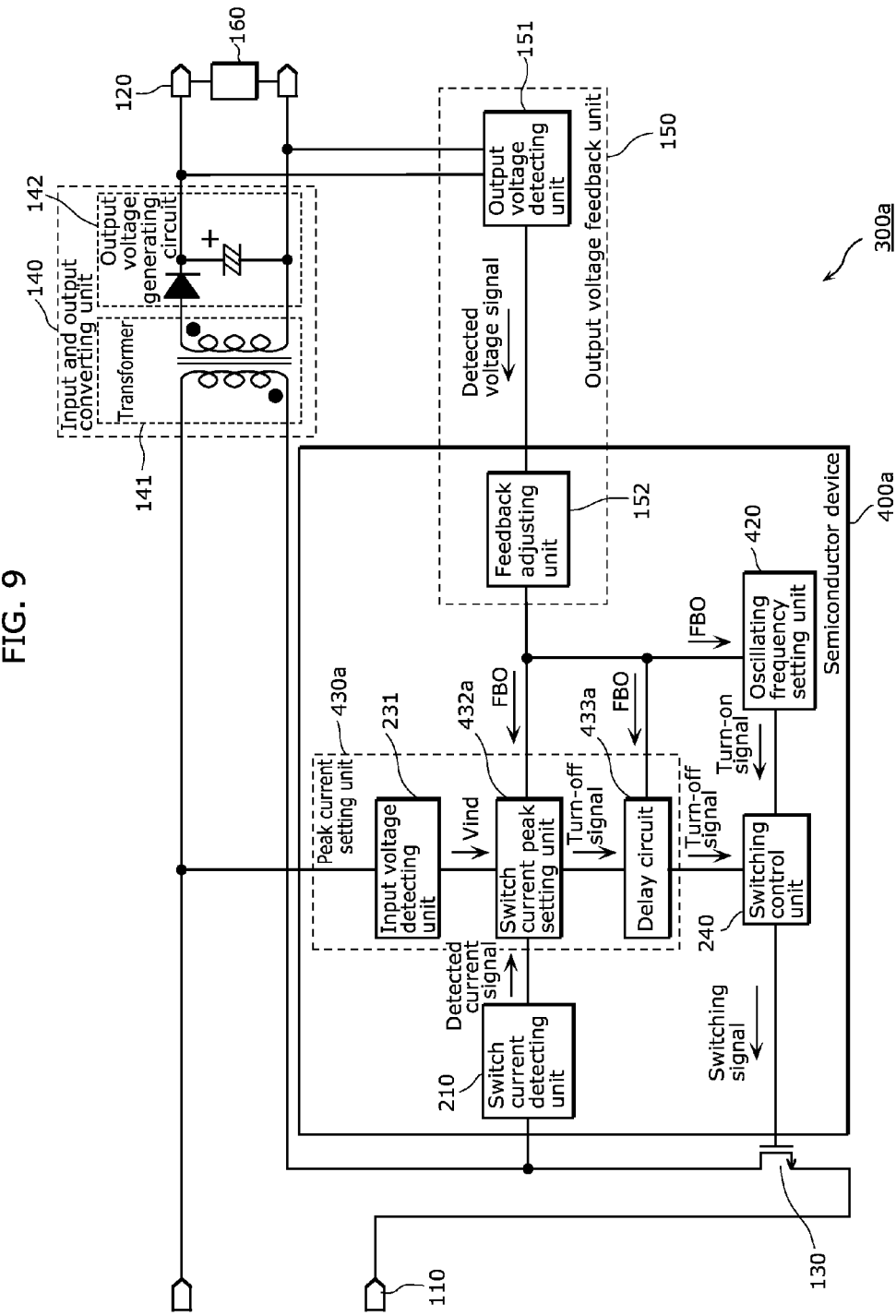
FIG. 9 is a circuit diagram showing an example of a configuration of a switching power supply apparatus according to Variation of Embodiment 2.

FIG. 9 is a circuit diagram showing an example of a configuration of a switching power supply apparatus 300a according to Variation of Embodiment 2. The switching power supply apparatus 300a according to Variation of Embodiment 2 shown in FIG. 9 is different from the switching power supply apparatus 300 according to Embodiment 2 shown in FIG. 4 in that a semiconductor device 400a is included instead of the semiconductor device 400. In the following, the constituent elements substantially same as those in Embodiment 2 are assigned with the same referential numerals, and their descriptions are omitted. Descriptions are mainly given of the points different from Embodiment 2.

The semiconductor device 400a is different from the semiconductor device 400 shown in FIG. 4 in that a peak current setting unit 430a is included instead of the peak current setting unit 430.

The peak current setting unit 430a includes an input voltage detecting unit 231, a switch current peak setting unit 432a, and a delay circuit 433a, as shown in FIG. 9.

The switch current peak setting unit 432a sets the current threshold Idp1 to increase as the output power increases, when the feedback signal FBO is below the threshold FB1, in the similar manner to the switch current peak setting unit 432. Furthermore, the switch current peak setting unit 432a sets the current threshold Idp to be constant relative to the output power and to increase as the input voltage detected by the input voltage detecting unit 231 increases, when the feedback signal FBO is above the threshold FB1. Subsequently, the switch current peak setting unit 432a outputs, to the delay circuit 433a, a turn-off signal for turning off the switching element 130, when the current detected by the switch current detecting unit 210 reaches the current threshold Idp1.

Figure 10A:
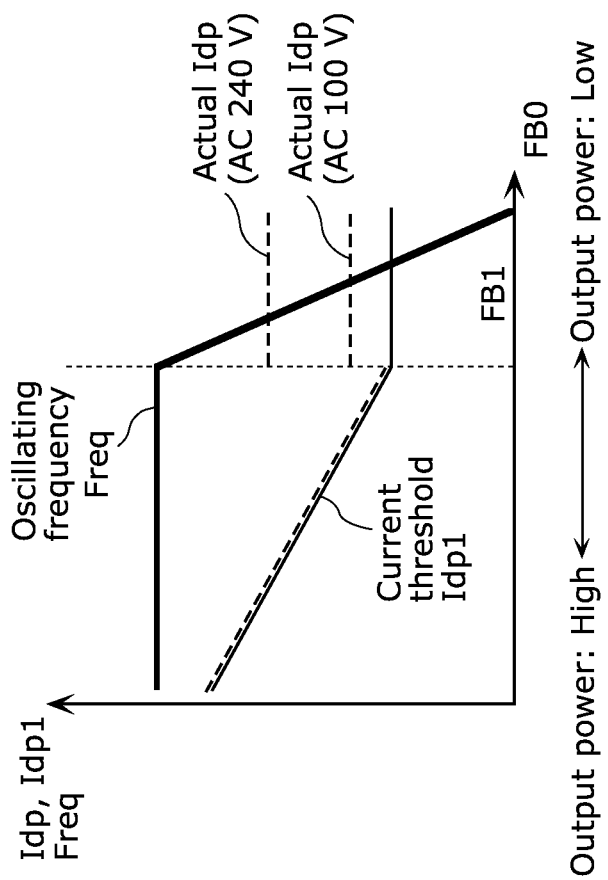
FIG. 10A is a diagram showing an example of setting of a current threshold, switch current peak, and oscillating frequency according to Variation of Embodiment 2.

More specifically, the switch current peak setting unit 432a sets the current threshold Idp1, based on the feedback signal FBO. Referring to FIG. 10A, a description will be given later of a specific example of setting of the current threshold Idp1.

The delay circuit 433a outputs a turn-off signal without applying a delay when the feedback signal FBO is below the threshold FB1, and outputs the turn-off signal with delay of a predetermined period when the feedback signal FBO is above the threshold FB1. In other words, the delay circuit 433a outputs the turn-off signal without applying a delay in the PWM operating mode, and outputs the turn-off signal with a delay in the PFM operating mode.

More specifically, the delay circuit 433a outputs the turn-off signal without applying a delay when the voltage value of the feedback signal FBO is below the threshold FB1, and outputs the turn-off signal with a delay when the voltage value of the feedback signal FBO is above the threshold FB1. Here, the threshold FB1 is varied by the switch current peak setting unit 432a according to the input voltage.

In the following, a description is given of the control of the switching operation of the switching element 130 according to Variation of Embodiment 2.

FIG. 10A is a diagram showing an example of setting of the current threshold Idp1, the switch current peak Idp, and the oscillating frequency Freq, according to Variation of Embodiment 2. In FIG. 10A, the horizontal axis represents the feedback signal FBO, and the vertical axis represents the current threshold Idp1, the switch current peak Idp, and the oscillating frequency Freq. As described above, the feedback signal FBO varies according to the condition of the load 160, that is, output power.

Furthermore, the switch current peak setting unit 432a sets the current threshold Idp1 to be constant relative to the output power and the input voltage, when the output power is below the first threshold. More specifically, the switch current peak setting unit 432a sets the current threshold Idp1 to be constant relative to the voltage value of the feedback signal FBO and the input voltage, when the voltage value of the feedback signal FBO is above the threshold FB1, as shown in FIG. 10A.

Here, the oscillating frequency setting unit 420 sets the oscillating frequency Freq to be constant relative to the output power, when the output power is above the first threshold, as shown in FIG. 10A. More specifically, the oscillating frequency setting unit 420 sets the oscillating frequency Freq to be constant relative to the voltage value of the feedback signal FBO, when the voltage value of the feedback signal FBO is below the threshold FB1.

Furthermore, the oscillating frequency setting unit 420 sets the oscillating frequency Freq to decrease as the output power decreases, when the output power is below the first threshold. More specifically, the oscillating frequency setting unit 420 sets the oscillating frequency Freq to decrease as the voltage value of the feedback signal FBO increases, as shown in FIG. 10A, when the voltage value of the feedback signal FBO is above the threshold FB1.

Here, the peak current setting unit 430a according to Variation of Embodiment 2 includes a delay circuit 433a. The delay circuit 433a delays a turn-off signal when the feedback signal FBO is above the threshold FB1, that is, only in the PFM operating mode. Accordingly, in the PFM operating mode, since the delay circuit 433a outputs a turn-off signal to the switching control unit 240 with a delay of a predetermined period, the actual switch current peak Idp varies according to the input voltage, as shown in FIG. 5. More specifically, as shown in FIG. 10A, the actual switch current peak Idp increases as the input voltage increases.

Figure 10B:
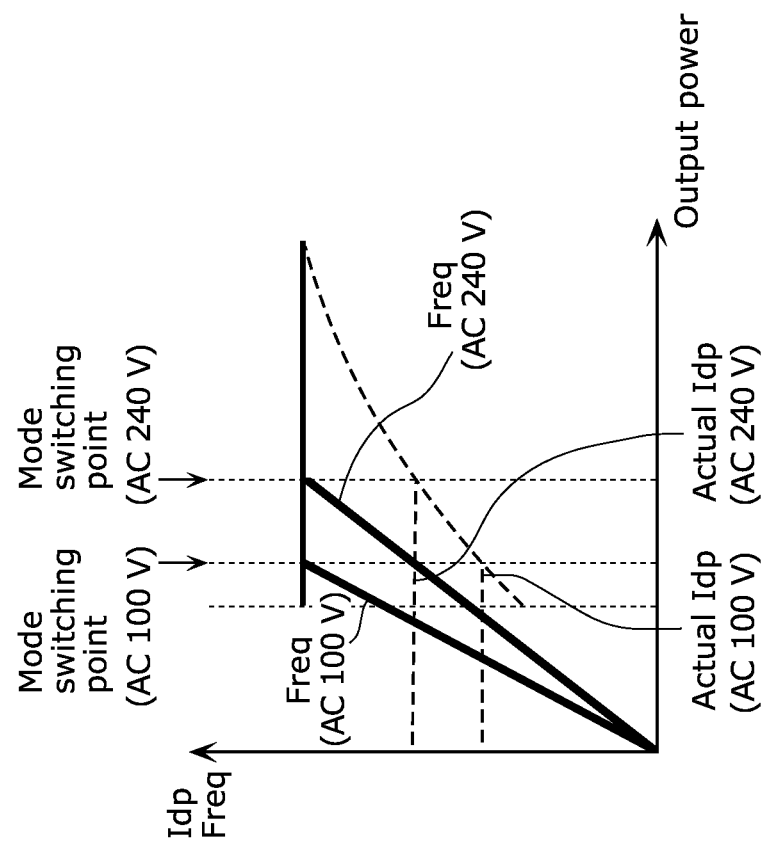
FIG. 10B is a diagram showing an example of setting of a current threshold, a switch current peak, and oscillating frequency according to Variation of Embodiment 2.

FIG. 10B is a diagram showing an example of setting of the switch current peak Idp and the oscillating frequency Freq according to Variation of Embodiment 2. In FIG. 10B, the horizontal axis represents output power, and the vertical axis represents the switch current peak Idp and the oscillating frequency Freq. As described above, the feedback signal FBO varies according to the condition of the load 160, that is, output power.

According to FIG. 10B, in the PFM operating mode, at the same output power, the switch current peak Idp increases and the oscillating frequency decreases as the input voltage increases. Accordingly, as shown in FIG. 8, it is possible to suppress a decrease in the power efficiency at high input and light load (low output power).

Furthermore, in the switching power supply apparatus 300a according Variation of Embodiment 2, the current threshold is determined without depending on the input voltage in the PWM operating mode. Accordingly, in the PWM operating mode, it is possible to decrease occurrence of influence of the input voltage on the maximum output power when the current flowing through the switching element is near the maximum value of the current threshold, that is, when the output power is maximum.

More specifically, when the maximum output power varies according to the input voltage, for example, excessive output power may be supplied to a load, which results in failure of the load. Here, it is possible to decrease that the maximum output power depends on the input voltage as described above. Specifically, it is possible to achieve a high-performance switching power supply apparatus.

Embodiment 3

A switching power supply apparatus according to Embodiment 3 controls the switching operation in the PWM operating mode in the case when the load condition becomes lighter while controlling the switching operation in the PFM operating mode in Embodiment 2. More specifically, when the feedback signal FBO is above a threshold FB2 that is greater than the threshold FB1 (when the output power is below a second threshold smaller than the first threshold), the oscillating frequency setting unit sets the switching frequency to be constant relative to the output power, and the switch current peak setting unit sets the current threshold to decrease as the output power decreases.

Furthermore, when the load condition becomes lighter while controlling the switching operation in the PWM operating mode at a light load, the switching power supply apparatus according to Embodiment 3 controls the switching operation in the PFM operating mode again. As described, as the load condition changes from a heavy load into a light load, the switching power supply apparatus according to Embodiment 3 controls the switching operation in order from the PWM operating mode, the PFM operating mode, the PWM operating mode, to the PFM operating mode.

Figure 11:
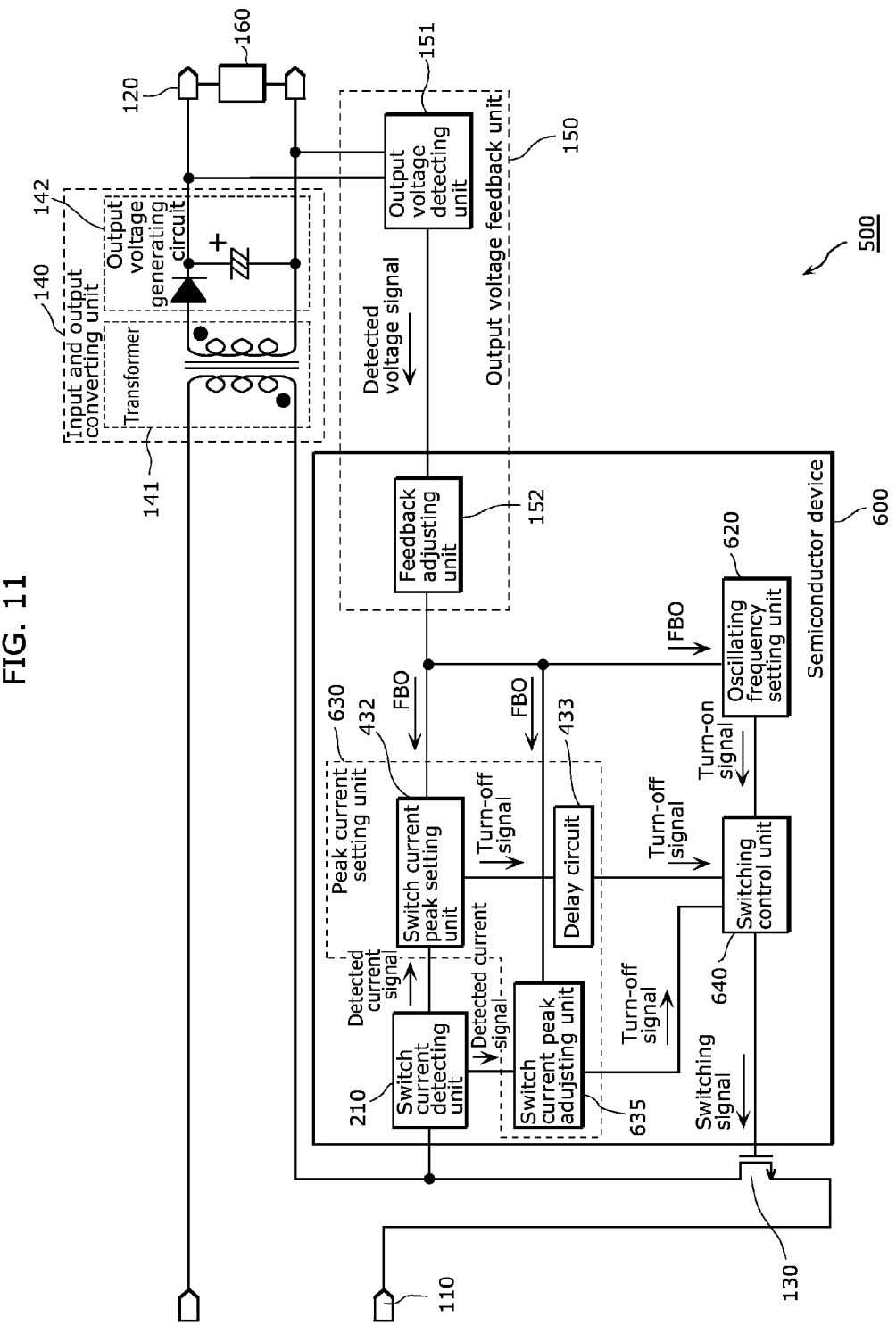
FIG. 11 is a circuit diagram showing an example of a configuration of a switching power supply apparatus according to Embodiment 3.

FIG. 11 is a circuit diagram showing an example of a configuration of a switching power supply apparatus 500 according to Embodiment 3. The switching power supply apparatus 500 according to Embodiment 3 shown in FIG. 11 is different from the switching power supply apparatus 300 according to Embodiment 2 shown in FIG. 4 in that a semiconductor device 600 is included instead of the semiconductor device 400. In the following, the constituent elements substantially same as those in Embodiment 2 are assigned with the same referential numerals, and their descriptions are omitted. Descriptions are mainly given of the points different from Embodiment 2.

The semiconductor device 600 is different from the semiconductor device 400 shown in FIG. 4 in that an oscillating frequency setting unit 620, a peak current setting unit 630, and a switching control unit 640 are included instead of the oscillating frequency setting unit 420, the peak current setting unit 430, and the switching control unit 240.

The oscillating frequency setting unit 620 sets the switching frequency of the switching element 130, based on the feedback signal FBO. More specifically, the oscillating frequency setting unit 620 sets the switching frequency Freq of the switching element 130, according to the condition of the load 160 connected to the output terminal 120. Furthermore, the oscillating frequency setting unit 620 sets the switching frequency to be constant relative to the output power, when the output power is above a first threshold, that is, when the feedback signal FBO is below a threshold FB1, and sets the switching frequency to decrease as the output power decreases when the output power is below the first threshold, that is, when the feedback signal FBO is above the threshold FB1.

Furthermore, the oscillating frequency setting unit 620 sets the switching frequency to be constant relative to the output power, when the output power is below a second threshold that is smaller than the first threshold, that is, when the feedback signal FBO is above a threshold FB2 that is greater than the threshold FB1. Furthermore, the oscillating frequency setting unit 620 sets the switching frequency to decrease as the output power decreases, when the output power is below a third threshold smaller than the second threshold, that is, when the feedback signal FBO is above a threshold FB3 that is greater than the threshold FB2.

In other words, the oscillating frequency setting unit 620 sets the switching frequency such that the operating mode changes in order from PWM, PFM, PWM to PFM as the output power decreases.

Figure 12:
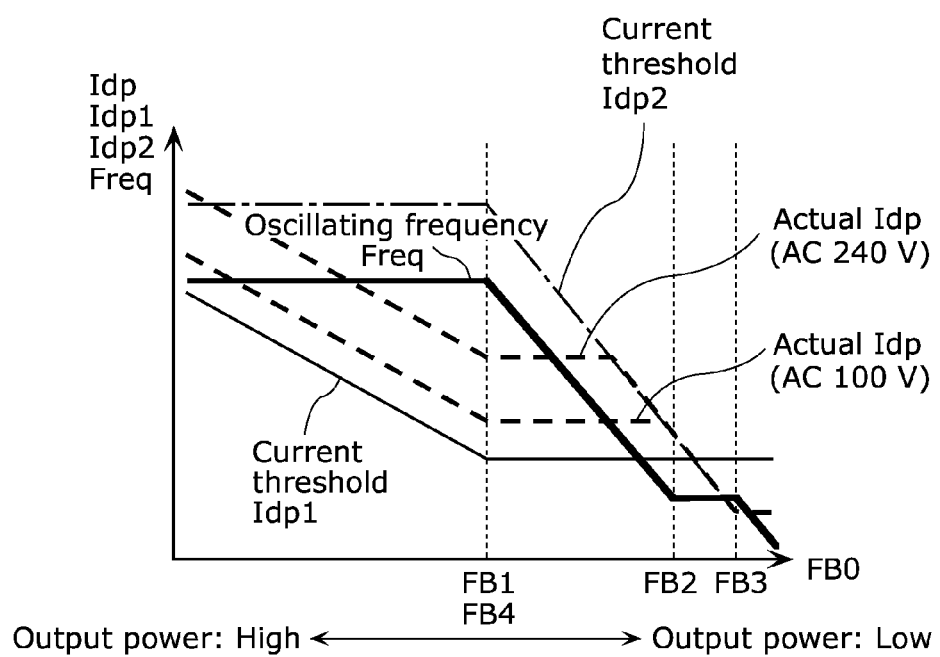
FIG. 12 is a diagram showing an example of setting of a current threshold, a switch current peak, and oscillating frequency according to Embodiment 3.

More specifically, the oscillating frequency setting unit 620 sets, based on the feedback signal FBO, the oscillating frequency Freq by varying time when the switching element 130 is turned on. Referring to FIG. 12, a description is given later of a specific example of setting of the oscillating frequency Freq that is an example of the switching frequency.

The peak current setting unit 630 sets, in a predetermined case, the current threshold Idp1 to control turn-off of the switching element 130, based on the detection result of the switch current detecting unit 210 and the current threshold Idp1. The current threshold Idp1 is set such that the switch current peak Idp is constant relative to the output power and increases as the input voltage increases. Furthermore, the predetermined case refers to the case where the switching operation of the switching element 130 is performed according to the PFM operating mode.

As shown in FIG. 11, the peak current setting unit 630 includes a switch current peak setting unit 432, a delay circuit 433, and a switch current peak setting unit 635. The switch current peak setting unit 432 and the delay circuit 433 are similar to those in Embodiment 2, and thus, descriptions thereof are omitted here.

The switch current peak setting unit 635 sets a current threshold Idp 2 to be constant relative to the output power and the input voltage, when the output power is above a fourth threshold, that is, when the feedback signal FBO is below a threshold FB4. Furthermore, the switch current peak setting unit 635 sets the current threshold Idp2 to decrease as the output power decreases, when the output power is below the fourth threshold, that is, when the feedback signal FBO is above the threshold FB4.

Furthermore, the switch current peak setting unit 635 sets the current threshold Idp2 to be constant relative to the output power and the input voltage, when the output power is below the third threshold, that is, when the feedback signal FBO is above the threshold FB3. Subsequently, the switch current peak setting unit 635 outputs, to the switching control unit 640, a turn-off signal for turning off the switching element 130, when the current detected by the switch current detecting unit 210 reaches the current threshold Idp1.

More specifically, the switch current peak setting unit 635 sets the current threshold Idp2, based on the feedback signal FBO. Referring to FIG. 12, a description will be given later of a specific example of setting of the current threshold Idp2.

The fourth threshold is a value greater than the third threshold, and is preferably a value greater than the second threshold. Furthermore, the magnitude relationship between the fourth threshold and the first threshold may be any relationship. In other words, the threshold FB4 is a value smaller than the threshold FB3, and is, preferably, a value smaller than the threshold FB2. Furthermore, the magnitude relationship between the threshold FB4 and the threshold FB1 may be any relationship.

The switching control unit 640 controls the switching operation of the switching element 130, based on the control results of the oscillating frequency setting unit 620 and the peak current setting unit 630. More specifically, the switching control unit 640 turns on the switching element 130 upon receipt of the turn-on signal from the oscillating frequency setting unit 620. Furthermore, the switching control unit 640 turns off the switching element 130 upon receipt of the turn-off signal from the peak current setting unit 630.

The switching control unit 640 receives the turn-off signal output from the delay circuit 433, and the turn-off signal output from the switch current peak setting unit 635. The switching control unit 640 turns off the switching element 130 upon receipt of at least one of the turn-off signals.

The switching control unit 640 controls the turn-on and turn-off of the switching element 130, that is, the switching operation of the switching element 130, by outputting a switching signal. The switching operation of the switching element 130 may be controlled by any methods. For example, the switching control unit 640 may perform control similar to that performed by the switching control unit 240 according to Embodiment 1.

Subsequently, a description is given of an operation of the switching power supply apparatus 500 according to Embodiment 3. More specifically, a description is given of an example of control of the switching operation of the switching element 130.

FIG. 12 is a diagram showing an example of setting of the current thresholds Idp1 and Idp2, switch current peak Idp, and oscillating frequency Freq according to Embodiment 3. In FIG. 12, the horizontal axis represents the feedback signal FBO, and the vertical axis represents the current thresholds Idp1 and Idp 2, the switch current peak Idp, and the oscillating frequency Freq. As described above, the feedback signal FBO varies according to the condition of the load 160, that is, output power.

In the switching power supply apparatus 500 according to Embodiment 3, the operating mode changes in order from PWM, PFM, PWM, to PFM as the condition of the load 160 changes from a heavy load to a light load. More specifically, in the switching power supply apparatus 500, as the output power decreases, the operating mode changes in order from PWM, PFM, PWM to PFM.

More specifically, the oscillating frequency setting unit 620 sets the oscillating frequency Freq to be constant relative to the output power, when the output power is above the first threshold. More specifically, the oscillating frequency setting unit 620 sets the oscillating frequency Freq to be constant relative to the voltage value of the feedback signal FBO, when the voltage value of the feedback signal FBO is below the threshold FB1, as shown in FIG. 12.

Furthermore, the oscillating frequency setting unit 620 sets the oscillating frequency Freq to decrease as the output power decreases, when the output power is below the first threshold and is above the second threshold. More specifically, the oscillating frequency setting unit 620 sets the oscillating frequency Freq to decrease as the voltage value of the feedback signal FBO increases as shown in FIG. 12, when the voltage value of the feedback signal FBO is above the threshold FB1 and is below the threshold FB2. Here, the threshold value FB2 is a value greater than the threshold FB1.

Furthermore, the oscillating frequency setting unit 620 sets the oscillating frequency Freq to be constant relative to the output power, when the output power is below the second threshold and is above the third threshold. More specifically, the oscillating frequency setting unit 620 sets the oscillating frequency Freq to be constant relative to the voltage value of the feedback signal FBO as shown in FIG. 12, when the voltage value of the feedback signal FBO is above the threshold FB2 and is below the threshold FB3. Here, the threshold value FB3 is a value greater than the threshold FB2.

Furthermore, the oscillating frequency setting unit 620 sets the oscillating frequency Freq to decrease as the output power decreases, when the output power is below the third threshold. More specifically, the oscillating frequency setting unit 620 sets the oscillating frequency Freq to decrease as the voltage value of the feedback signal FBO increases as shown in FIG. 12, when the voltage value of the feedback signal FBO is above the threshold FB3.

The switch current peak setting unit 432 is similar to that in Embodiment 2, and thus, descriptions thereof are omitted here. More specifically, the current threshold Idp1 is similar to that in FIG. 6A according to Embodiment 2.

The switch current peak setting unit 635 sets the current threshold Idp2 to be constant relative to the output power and the input voltage, when the output power is above the fourth threshold. More specifically, the switch current peak setting unit 635 sets the current threshold Idp2 to be constant relative to the voltage value of the feedback signal FBO and the input voltage, when the voltage value of the feedback signal FBO is below the threshold FB4.

Here, as shown in FIG. 12, it is preferable that the value of the current threshold Idp2 is greater than the current threshold Idp1 when the output power is above the first threshold, that is, when the feedback signal FBO is below the threshold FB1. Furthermore, the magnitude relationship between the threshold FB4 and the threshold FB1 may be any relationship. In FIG. 12, as an example, the first threshold matches the fourth threshold, that is, the threshold FB1 matches the threshold FB4. Furthermore, the threshold FB4 is a value smaller than the threshold FB3.

Furthermore, the switch current peak setting unit 635 sets the current threshold Idp2 to decrease as the output power decreases, when the output power is below the fourth threshold and is greater than the third threshold. More specifically, the switch current peak setting unit 635 sets the current threshold Idp2 to decrease as the voltage value of the feedback signal FBO increases when the voltage value of the feedback signal FBO is above the threshold FB4 and is below the threshold FB3.

Furthermore, the switch current peak setting unit 635 sets the current threshold Idp2 to be constant relative to the output power and the input voltage, when the output power is below the third threshold. More specifically, the switch current peak setting unit 635 sets the current threshold Idp2 to be constant relative to the voltage value of the feedback signal FBO and the input voltage, when the voltage value of the feedback signal FBO is above the threshold FB3.

Here, the actual switch current peak Idp is the current flowing through the switching element 130 when the turn-off signal is input to the switching control unit 640. In the switching power supply apparatus 500 according to Embodiment 3, since the two processing units which are the delay circuit 433 and the switch current peak setting unit 635 output turn-off signals, the switch current peak Idp is set by the delay circuit 433 and the switch current peak setting unit 635.

More specifically, the switch current peak Idp is determined by one of the current threshold Idp 2 and the current value determined by the current threshold Idp1 and delay effects (current threshold Idp1+value corresponding to the delay), whichever is smaller. In the example shown in FIG. 12, in the PWM operating mode and a part of the PFM operating mode at a heavy load (high output power) side, the current threshold Idp2 is higher than the current threshold Idp1+value corresponding to the delay. As a result, the switch current peak Idp is the current threshold Idp1+value corresponding to the delay. Here, the switching control unit 640 receives the turn-off signal output from the delay circuit 433, and turns off the switching element 130.

In this period, the delay circuit 433 outputs the turn-off signal to the switching control unit 640 with a delay of a predetermined period; and thus, as shown in FIG. 12, the actual switch current peak Idp varies according to the input voltage. More specifically, as shown in FIG. 12, the actual switch current peak Idp increases as the input voltage increases.

Furthermore, in the example shown in FIG. 12, in the remaining of the PFM operating mode at the heavy load side, and in the PWM operating mode and the PFM operating mode at a light load (low output power) side, the current threshold Idp2 is smaller than the current threshold Idp1+value corresponding to the delay, and the switch current peak Idp substantially matches the current threshold Idp2. Here, the switching control unit 640 receives the turn-off signal output from the switch current peak setting unit 635, and turns off the switching element 130.

As described above, the switching power supply apparatus 500 according to Embodiment 3 controls the switching operation in the PWM operating mode, when the feedback signal FBO is above the threshold FB2 that is greater than the threshold FB1, that is, when the load condition is lighter than the light load at which the switching operation is controlled in the PFM operating mode.

Accordingly, when the oscillating frequency Freq is low and noise of the transformer 141 is in the audible frequency range, the switching operation is controlled in the PWM operating mode. As a result, it is possible to decrease the switch current peak Idp. This reduces the noise of the transformer 141.

Furthermore, the switching power supply apparatus 500 according to Embodiment 3 controls the switching operation in the PFM operating mode when the load condition is lighter than the light load at which the switching operation is controlled in the PFM operating mode. As a result, it is possible to reduce power consumption of the switching power supply apparatus 500.

In Embodiment 3, descriptions have been given of the example of the switching power supply apparatus 500 where the operating mode is changed in order from PWM, PFM, PWM to PFM, as the output power decreases, that is, as the load condition changes from a heavy load to a light load. In contrast, it may be that the PFM operating mode is not performed at a light load. More specifically, in the switching power supply apparatus 500 according to Embodiment 3, it may be that the operating mode is changed in order from PWM, PFM, to PWM, as the condition of the load 160 changes from a heavy load to a light load.

Figure 13A:
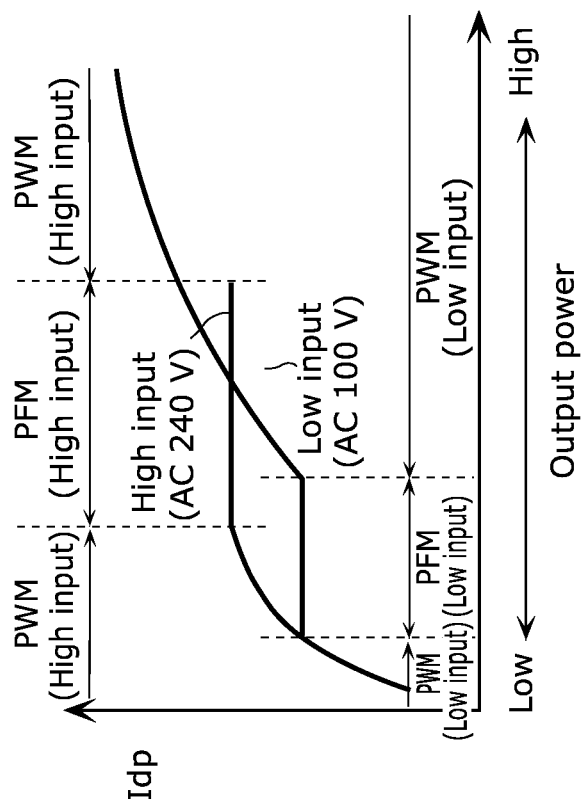
FIG. 13A is a diagram showing another example of setting of a switch current peak according to Embodiment 3.

FIG. 13A is a diagram showing another example of setting of the switch current peak Idp according to Embodiment 3. In FIG. 13A, the horizontal axis represents output power, and the vertical axis represents the switch current peak Idp.

Figure 13B:
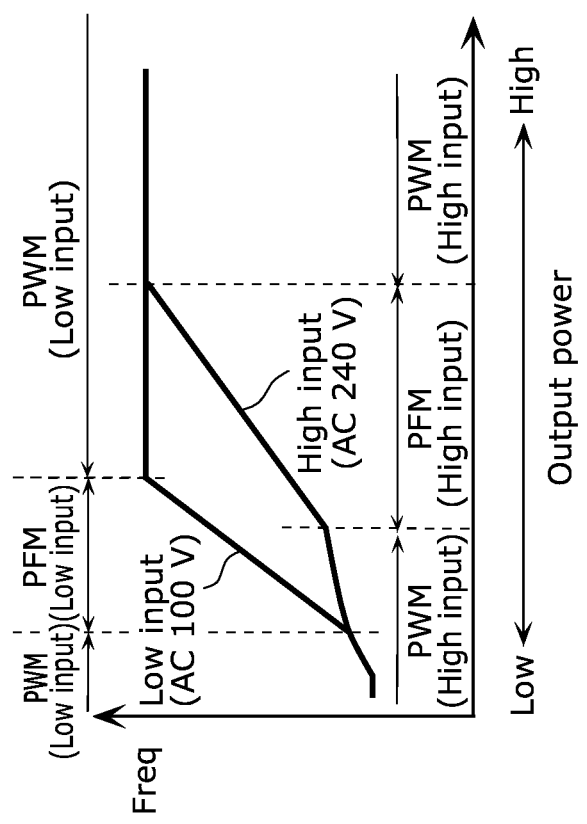
FIG. 13B is a diagram showing another example of setting of oscillating frequency according to Embodiment 3.

FIG. 13B is a diagram showing another example of setting of oscillating frequency Freq according to Embodiment 3. In FIG. 13B, the horizontal axis represents output power, and the vertical axis represents oscillating frequency Freq.

As described referring to FIG. 12, the oscillating frequency setting unit 620 sets the oscillating frequency Freq such that the operating mode is changed in order from PWM, PFM, to PWM, as the output power decreases. Here, since there is no PFM operating mode at low output power, the oscillating frequency setting unit 620 need not determine the threshold FB3 for changing the operating mode from the PWM operating mode to the PFM operating mode at low output power.

Furthermore, as described referring to FIG. 12, the peak current setting unit 630 sets the current thresholds Idp1 and Idp2 such that the operating mode is changed in order from PWM, PFM to PWM as the output power decreases. Here, since there is no PFM operating mode at low output power, the peak current setting unit 630 need not determine the threshold FB3 for switching the operating mode between the PWM operating mode and the PFM operating mode at low output power.

As shown in FIG. 13B, the oscillating frequency setting unit 620 sets the oscillating frequency Freq to decrease as the output power decreases instead of setting the oscillating frequency Freq to be constant, in the PWM operating mode at low output power. Here, the ratio of decrease in the oscillating frequency Freq is smaller than the ratio of decrease in the oscillating frequency Freq in the PFM operating mode. As described above, the oscillating frequency Freq need not be constant in the PWM operating mode at low output power (at a light load).

As described above, in the another example of Embodiment 3, too, the switching operation is controlled in the PWM operating mode, when the feedback signal FBO is above the threshold FB2 that is greater than the threshold FB1, that is, when the load condition is lighter than the light load at which the switching operation is controlled in the PFM operating mode.

Accordingly, when the oscillating frequency Freq is low and noise of the transformer 141 is in the audible frequency range, the switching operation is controlled in the PWM operating mode. As a result, it is possible to decrease the switch current peak Idp. This reduces the noise of the transformer 141.

Embodiment 4

While controlling the switching operation in the PWM operating mode at a light load in Embodiment 3, the switching power supply apparatus according to Embodiment 4 controls the switching operation in not the PFM operating mode but in an intermittent-oscillation mode when the load condition becomes lighter. As described, the switching power supply apparatus according to Embodiment 4 controls the switching operation in order from the PWM operating mode, the PFM operating mode, the PWM operating mode, to the intermittent-oscillation mode, as the load condition changes from a heavy load to a light load.

Figure 14:
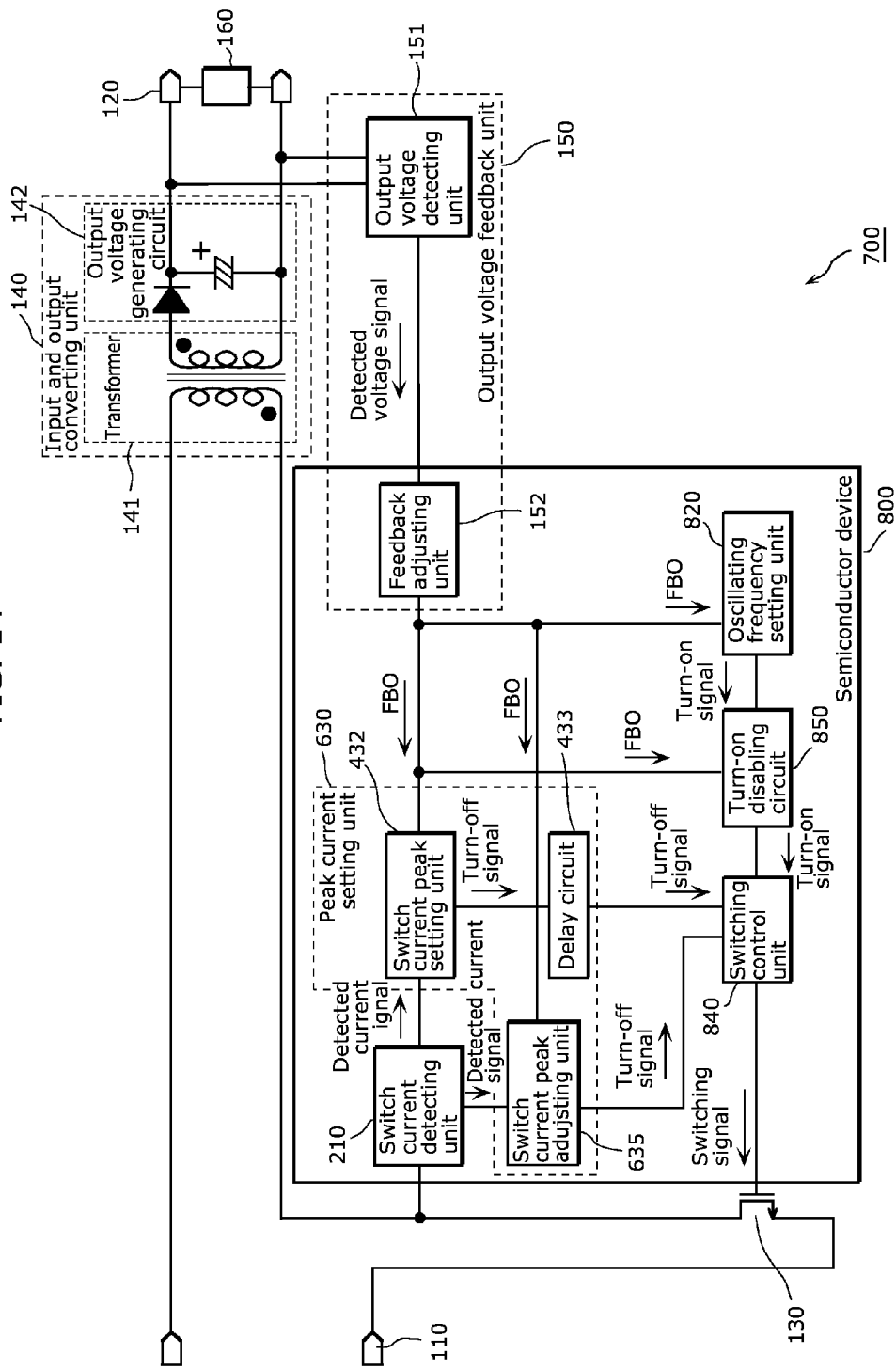
FIG. 14 is a circuit diagram showing an example of a configuration of a switching power supply apparatus according to Embodiment 4.

FIG. 14 is a circuit diagram showing an example of a configuration of a switching power supply apparatus 700 according to Embodiment 4. The switching power supply apparatus 700 according to Embodiment 4 shown in FIG. 14 is different from the switching power supply apparatus 500 according to Embodiment 3 shown in FIG. 11 in that a semiconductor device 800 is included instead of the semiconductor device 600. In the following, the constituent elements substantially same as those in Embodiment 3 are assigned with the same referential numerals, and their descriptions are omitted. Descriptions are mainly given of the points different from Embodiment 3.

The semiconductor device 800 is different from the semiconductor device 600 shown in FIG. 11 in that an oscillating frequency setting unit 820 and a switching control unit 840 are included instead of the oscillating frequency setting unit 620 and the switching control unit 640 and that a turn-on disabling circuit 850 is included.

The oscillating frequency setting unit 820 performs operations substantially equivalent to those performed by the oscillating frequency setting unit 620. More specifically, the oscillating frequency setting unit 820 sets the switching frequency to cause intermittent oscillation instead of setting the switching frequency to decrease as the output power decreases, when the output power is below the third threshold that is smaller than the second threshold, that is, when the feedback signal FBO is above the threshold FB3 that is greater than the threshold FB2.

In other words, the oscillating frequency setting unit 820 sets the switching frequency such that the operating mode changes in order from PWM, PFM, PWM, to intermittent oscillation as the output power decreases.

Figure 15:
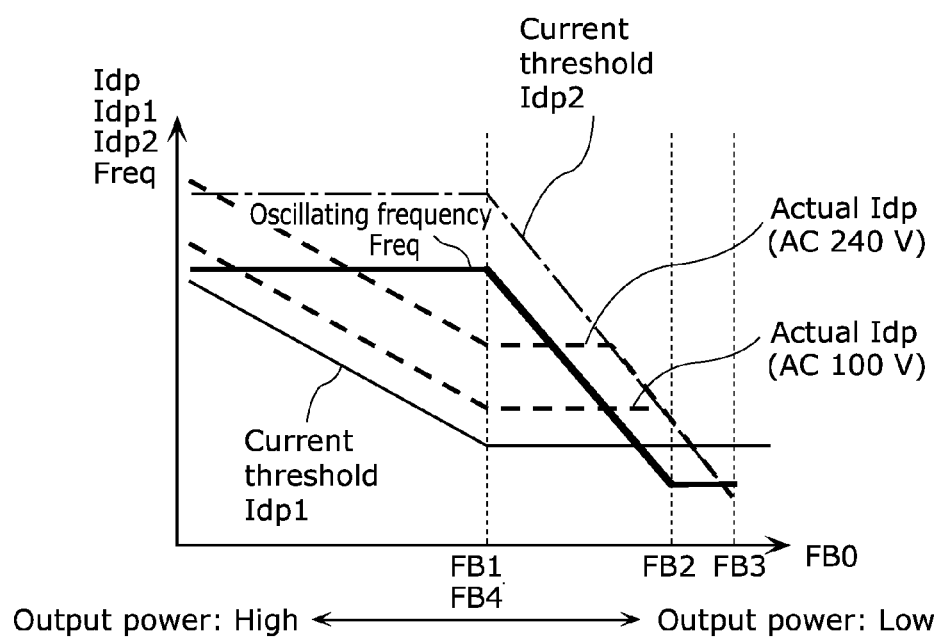
FIG. 15 is a diagram showing an example of setting of a current threshold, a switch current peak, and oscillating frequency according to Embodiment 4.

More specifically, the oscillating frequency setting unit 820 sets, based on the feedback signal FBO, the oscillating frequency Freq by varying time when the switching element 130 is turned on. Referring to FIG. 15, a description is given later of a specific example of setting of the oscillating frequency Freq that is an example of the switching frequency.

The switching control unit 840 controls the switching operation of the switching element 130, based on the control results of the oscillating frequency setting unit 820 and the peak current setting unit 630. More specifically, the switching control unit 840 turns on the switching element 850 upon receipt of the turn-on signal from the oscillating frequency setting unit 820 via the turn-on disabling circuit 850. Furthermore, the switching control unit 840 turns off the switching element 130 upon receipt of the turn-off signal from the peak current setting unit 630.

The switching control unit 840 receives the turn-off signal output from the delay circuit 433, and the turn-off signal output from the switch current peak setting unit 635. The switching control unit 840 turns off the switching element 130 upon receipt of at least one of the turn-off signals.

The switching control unit 840 controls turn-on and turn-off of the switching element 130, that is, the switching operation of the switching element 130, by outputting a switching signal. The switching operation of the switching element 130 may be controlled by any methods. For example, the switching control unit 840 may perform control similar to that performed by the switching control unit 240 according to Embodiment 1.

The turn-on disabling circuit 850 controls whether to transmit the turn-on signal from the oscillating frequency setting unit 820 to the switching control unit 840. More specifically, the turn-on disabling circuit 850 outputs, to the switching control unit 840, the turn-on signal output from the oscillating frequency setting unit 820, when the feedback signal FBO is below the threshold FB3. Furthermore, the turn-on disabling circuit 850 does not output, to the switching control unit 840, the turn-on signal output from the oscillating frequency setting unit 820, when the feedback signal FBO is above the threshold FB3.

More specifically, the turn-on disabling circuit 850 outputs, to the switching control unit 840, the turn-on signal output from the oscillating frequency setting unit 820, when the voltage value of the feedback signal FBO is below the threshold FB3. Furthermore, the turn-on disabling circuit 850 does not output the turn-on signal output from the oscillating frequency setting unit 820 to the switching control unit 840, when the voltage value of the feedback signal FBO is above the threshold FB3.

Subsequently, a description is given of the operation of the switching power supply apparatus 700 according to Embodiment 4. More specifically, a description is given of an example of control of the switching operation of the switching element 130.

FIG. 15 is a diagram showing an example of setting of the current thresholds Idp1 and Idp2, switch current peak Idp, and oscillating frequency Freq according to Embodiment 4. In FIG. 15, the horizontal axis represents the feedback signal FBO, and the vertical axis represents the current thresholds Idp1 and Idp2, the switch current peak Idp, and the oscillating frequency Freq. As described above, the feedback signal FBO varies according to the condition of the load 160, that is, output power.

In the switching power supply apparatus 700 according to Embodiment 4, the operating mode changes in order from PWM, PFM, PWM, to intermittent oscillation as the condition of the load 160 changes from a heavy load to a light load. More specifically, in the switching power supply apparatus 700, as the output power decreases, the operating mode changes in order from PWM, PFM, PWM to intermittent oscillation.

FIG. 15 is substantially the same as FIG. 12 described in Embodiment 3; and thus, different points will be mainly described in the following. More specifically, a description is given of the oscillating frequency Freq and the switch current peak Idp when the output power is below the third threshold, that is, when the voltage value of the feedback signal FBO is above the threshold FB3.

The oscillating frequency setting unit 820 sets the oscillating frequency Freq to cause intermittent oscillation, when the output power is below the third threshold. More specifically, the oscillating frequency setting unit 820 sets the oscillating frequency Freq to cause intermittent oscillation, as shown in FIG. 15, when the voltage value of the feedback signal FBO is above the threshold FB3.

The switch current peak setting unit 432 and the switch current peak setting unit 635 are similar to those in Embodiment 3; and thus, descriptions thereof are omitted here. More specifically, the current thresholds Idp1 and Idp2 are equivalent to those in FIG. 12 according to Embodiment 3. Accordingly, the switch current peak Idp is also similar to that in FIG. 12 according to Embodiment 3.

As described above, the switching power supply apparatus 700 according to Embodiment 4 controls the switching operation in the PWM operating mode, when the feedback signal FBO is above the threshold FB2 that is greater than the threshold FB1, that is, when the load condition is lighter than the light load at which the switching operation is controlled in the PFM operating mode.

Accordingly, when the oscillating frequency Freq is low and noise of the transformer 141 is in the audible frequency range, the switching operation is controlled in the PWM operating mode. As a result, it is possible to decrease the switch current peak Idp. This reduces the noise of the transformer 141.

Furthermore, the switching power supply apparatus 700 according to Embodiment 4 controls the switching operation in the intermittent-oscillation mode when the load is lighter than the light load in the PWM operating mode. As a result, it is possible to reduce power consumption of the switching power supply apparatus 700.

Embodiment 5

In the switching power supply apparatus according to Embodiment 3, the value of the switch current peak Idp is varied by the current threshold Idp2 in the PWM operation at a light load. In contrast, in the switching power supply apparatus according to Embodiment 5, the current threshold Idp2 is not used. In the switching power supply apparatus according to Embodiment 5, the length of the delay period generated by the delay circuit 733 decreases according to the output power, and then the current threshold Idp1 is decreased again. Subsequently, the switching operation is performed in order from the PWM operating mode, the PFM operating mode, the PWM operating mode, to the PFM operating mode, as the state of the output power changes from high to low.

Figure 16A:
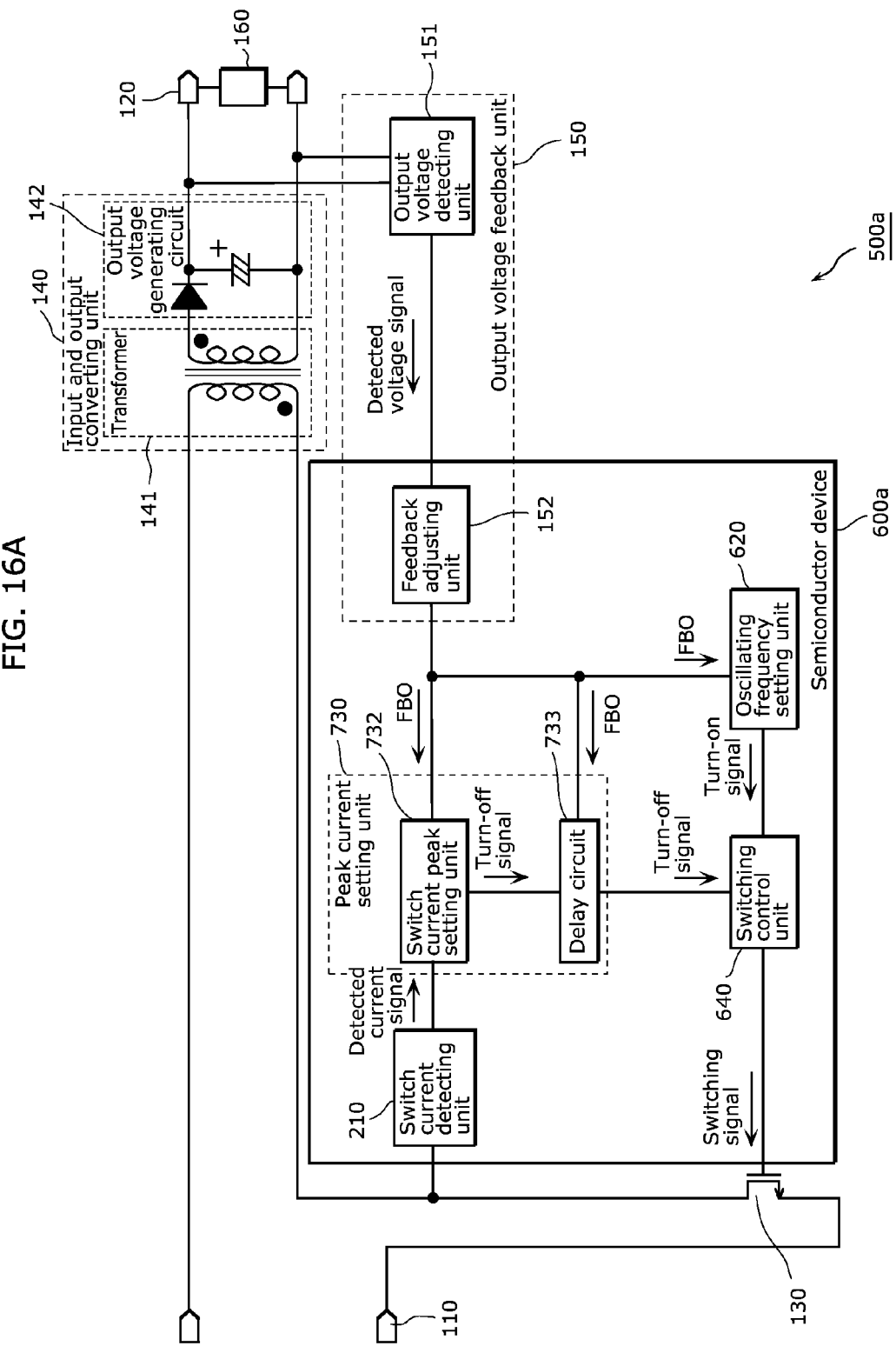
FIG. 16A is a circuit diagram showing an example of a configuration of a switching power supply apparatus according to Embodiment 5.

FIG. 16A is a circuit diagram showing an example of a configuration of a switching power supply apparatus 500a according to Embodiment 5. The switching power supply apparatus 500a is different from the switching power supply apparatus 500 according to Embodiment 3 shown in FIG. 11 in that a semiconductor device 600a is included instead of the semiconductor device 600. In the following, the constituent elements substantially same as those in Embodiment 3 are assigned with the same referential numerals, and their descriptions are omitted. Descriptions are mainly given of the points different from Embodiment 3.

The semiconductor device 600a is different from the semiconductor device 600 shown in FIG. 11 in that a peak current setting unit 730 is included.

The peak current setting unit 730 is different from the peak current setting unit 630 shown in FIG. 11 in that a switch current peak setting unit 732 and a delay circuit 733 which receives a feedback signal FBO are included, instead of the switch current peak setting unit 432 and the delay circuit 433, and that the switch current peak setting unit 635 is not included.

When the feedback signal FBO is above the threshold FB1 and below the threshold FB2 and output power is below the first threshold and above the second threshold, the oscillating frequency setting unit 620 decreases the oscillating frequency in the similar manner to Embodiment 3. Furthermore, when output power decreases, the feedback signal FBO is above the threshold FB2, and the output power is below the second threshold, the delay circuit 733 decreases the length of the delay period of the turn-off signal as the feedback FBO increases, that is, as the output power decreases.

Furthermore, the delay period generated by the delay circuit 733 is zero, when the output power is below the fifth threshold and the feedback signal FBO increases to the threshold FB5. Furthermore, when the feedback signal FBO is equal to the threshold FB5 or above, the switch current peak setting unit 732 decreases the current threshold Idp1. The fifth threshold is below the second threshold and above the third threshold, and the threshold FB5 is above the threshold FB2 and is below the threshold FB3.

Furthermore, when output power decreases, the feedback signal FBO is above the threshold FB3 and the output power is below the third threshold, the switch current peak setting unit 732 sets the current threshold Idp1 to be constant relative to the feedback signal FBO, and the oscillating frequency setting unit 620 decreases the oscillating frequency.

Figure 16B:
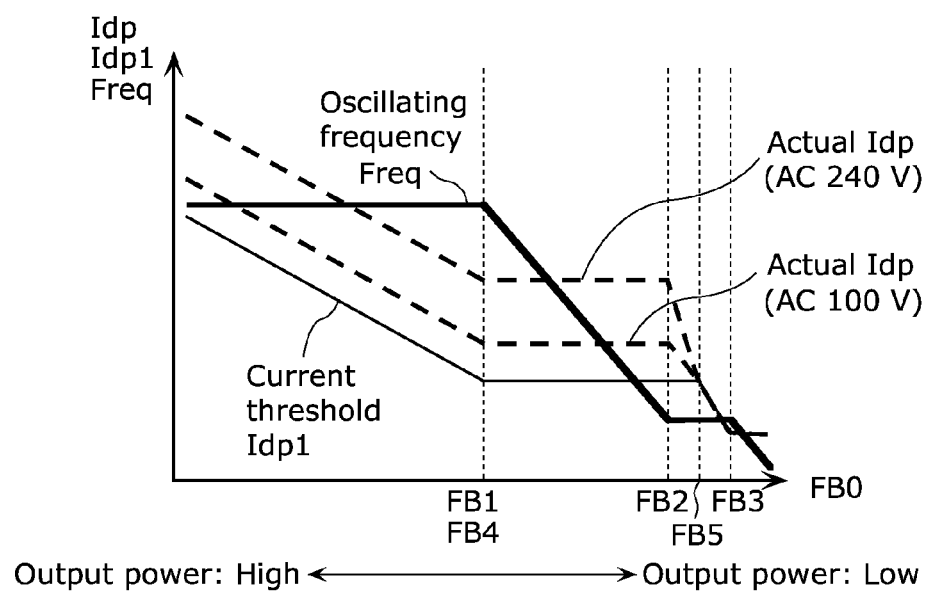
FIG. 16B is a diagram showing an example of setting of a current threshold, a switch current peak, and oscillating frequency according to Embodiment 5.

FIG. 16B is a diagram showing an example of setting of the current threshold Idp1, the switch current peak Idp, and the oscillating frequency Freq, according to Embodiment 5. In FIG. 16B, the horizontal axis represents the feedback signal FBO, and the vertical axis represents the current thresholds Idp1, the switch current peak Idp, and the oscillating frequency Freq. As described above, the feedback signal FBO varies according to the condition of the load 160, that is, output power.

As shown in FIG. 16B, in the range where output power is below the second threshold and is above the fifth threshold, that is, in the range where the feedback signal FBO is above the threshold FB2 and is below the threshold FB5, the actual switch current peak Idp decreases because the length of the delay period of the turn-off signal decreases. Furthermore, when the feedback signal FBO is equal to the threshold FB5 or below, the current threshold Idp1 decreases, which results in a decrease in the actual switch current peak Idp. More specifically, in the switching power supply apparatus 500a, as the output power decreases, the operating mode changes in order from PWM, PFM, PWM to PFM.

As described above, in the switching power supply apparatus 500a according to Embodiment 5, when the feedback signal FBO is above the threshold FB2 and is below the threshold FB5, the delay circuit 733 decreases the length of the delay period of a turn-off signal. The switching power supply apparatus 500a decreases the current threshold Idp1 when the feedback signal FBO is above the threshold FB5 and is below the threshold FB3, and decreases the switch current peak Idp according to a decrease in the output power when the output power is below the second threshold and above the third threshold.

Accordingly, it is possible to decrease the switch current peak value Idp in the PFM operation when the feedback signal is above the threshold FB3 and output power is below the third threshold. Accordingly, it is possible to reduce noise of a transformer even when the oscillating frequency decreases to the audible frequency range due to the PFM operation.

Furthermore, in Embodiment 3, two current thresholds Idp1 and Idp2 are used, which requires adjustment of circuit setting when the operating mode is changed from the PFM operation to the PWM operation at the second threshold of the output power, in particular. However, in Embodiment 5, circuit setting is relatively easy because the change of the operation at the second threshold is to switch the change in the oscillating frequency to the change in the delay period.

In Embodiment 5, the delay period is zero when the feedback signal FBO decreases to the threshold FB5. However, the delay period need not be zero, but may be a limited value.

Embodiment 6

In Embodiments 1 to 5, descriptions have been given of the flyback switching power supply apparatuses which use a transformer for the input and output converting unit. In contrast, the switching power supply apparatus according to Embodiment 6 is a step-down chopper circuit, polarity reversal chopper circuit, or a step-up chopper circuit.

First, a description is given of an example of the step-down chopper circuit.

Figure 17:
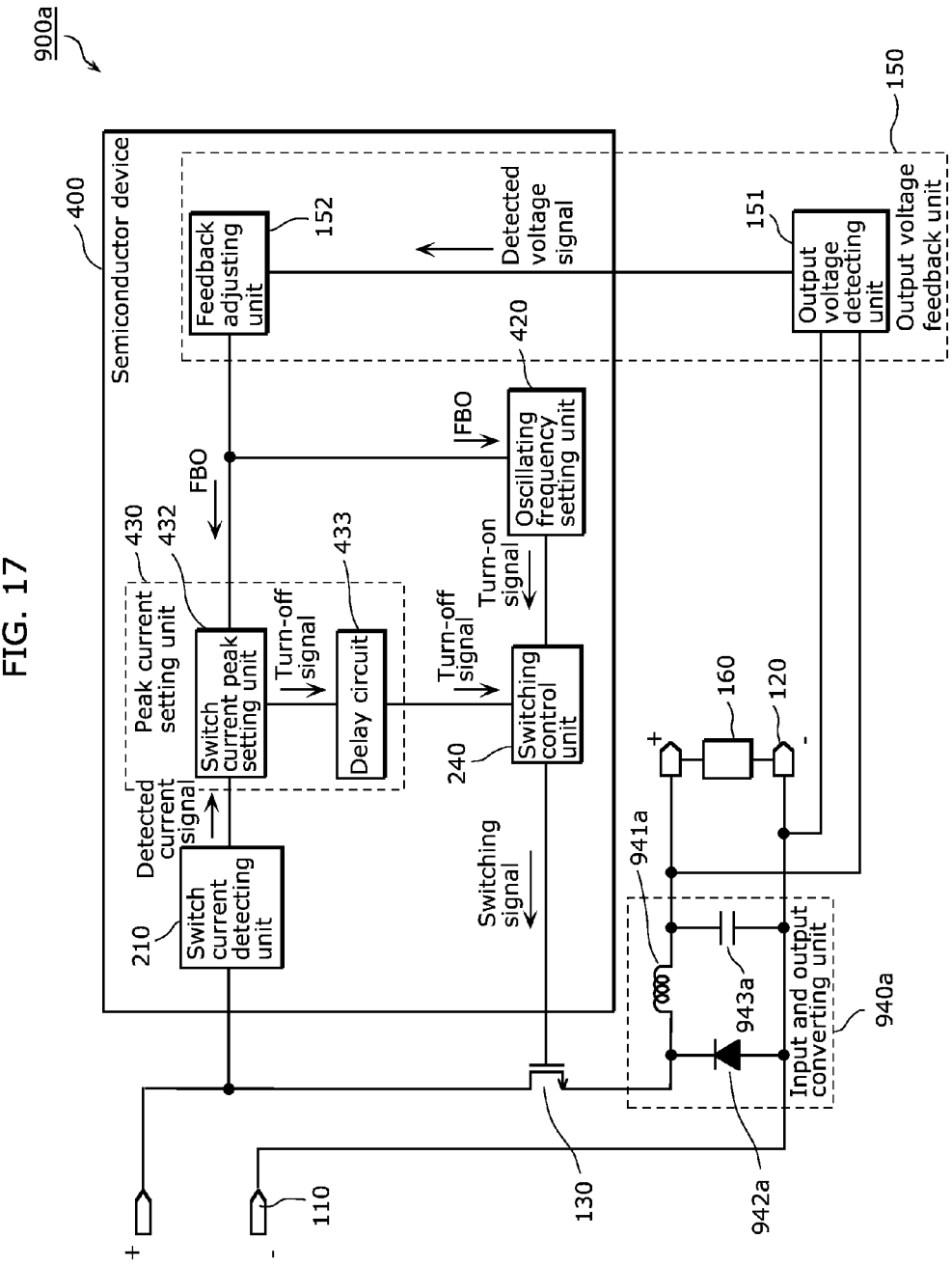
FIG. 17 is a circuit diagram showing an example of a configuration of a switching power supply apparatus serving as a step-down chopper circuit according to Embodiment 6.

FIG. 17 is a circuit diagram showing an example of a configuration of a switching power supply apparatus 900a serving as a step-down chopper circuit according to Embodiment 6. The switching power supply apparatus 900a according to Embodiment 6 shown in FIG. 17 is different from the switching power supply apparatus 300 according to Embodiment 2 shown in FIG. 4 in that an input and output converting unit 940a is included instead of the input and output converting unit 140. In the following, the constituent elements substantially same as those in Embodiment 2 are assigned with the same referential numerals, and their descriptions are omitted. Descriptions are mainly given of the points different from Embodiment 2.

The input and output converting unit 940a converts, into output voltage, input voltage input to the input terminal 110 and applied through the switching element 130, and supplies output power to the load 160 connected to the output terminal 120. As shown in FIG. 17, the input and output converting unit 940a includes a coil 941a, a diode 942a, and a capacitor 943a.

The coil 941a is an example of an energy transferring element, and is connected between the positive terminal of the input terminal 110 and the positive terminal of the output terminal 120 via the switching element 130. The coil 941a converts, into AC output voltage, the input voltage input to the input terminal 110 and applied through the switching element 130.

The diode 942a is an example of a rectifying element. The diode 942a has: an anode connected to the negative side of the input terminal 110 and the negative side of the output terminal; and a cathode connected to a connection point between the switching element 130 and the coil 941a. The diode 942a rectifies the AC output voltage generated by the coil 941a.

The capacitor 943a is an example of a smoothing capacitative element. The capacitor 943a has one terminal connected to a connection point between the coil 941a and the positive side of the output terminal 120, and the other terminal connected to the negative side of the input terminal 110 and the negative side of the output terminal 120. The capacitor 943a smoothes the AC output voltage generated by the coil 941a.

With the above configuration, the switching power supply apparatus 900a according to Embodiment 6 generates DC output voltage at the output terminal 120 by switching DC input voltage using the switching element 130. Here, since the switching power supply apparatus 900a is a step-down chopper circuit as shown in FIG. 17, the switching power supply apparatus 900a generates output voltage lower than the input voltage.

It is to be noted that the semiconductor device which controls the switching operation of the switching element 130 is the same as the semiconductor device 400 according to Embodiment 2. Accordingly, in Embodiment 6, too, in the PFM operating mode in which the switch current peak Idp is constant relative to the output power, it is possible to increase the switch current peak Idp as the input voltage increases, in the similar manner to Embodiment 2. Hence, in the similar manner to Embodiment 1, in the PFM operating mode, it is possible to increase the power efficiency at high input voltage.

Furthermore, it is possible to increase the power efficiency at high input voltage in the entire output power range (entire load range). In particular, the loss caused by the switching operation can be reduced at high input voltage and at a light load which is significantly influenced by the loss caused by the switching operation.

Next, a description is given of an example of a polarity reversal chopper circuit.

Figure 18:
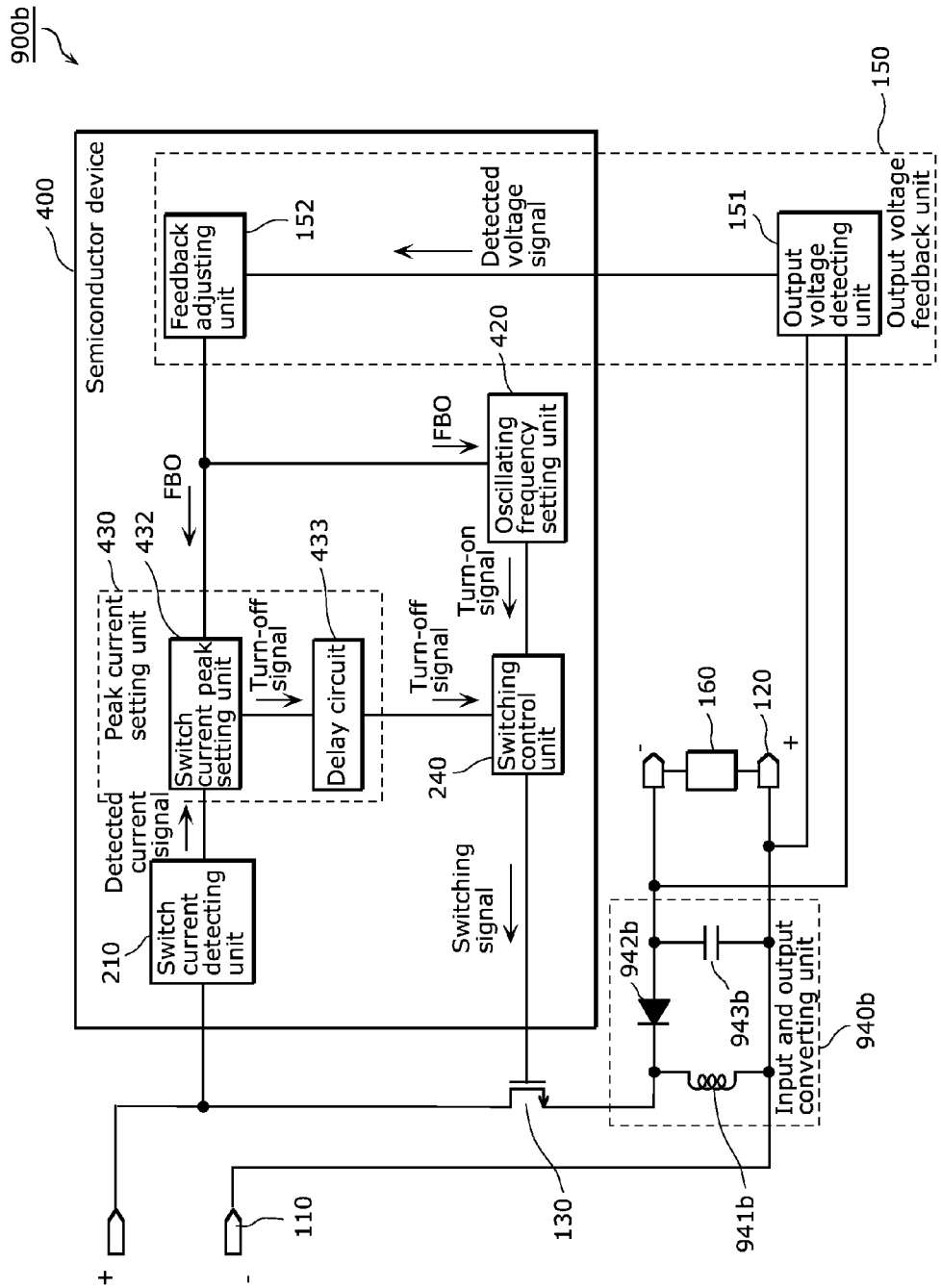
FIG. 18 is a circuit diagram showing an example of a configuration of a switching power supply apparatus serving as a polarity reversal chopper circuit according to Embodiment 6.

FIG. 18 is a circuit diagram showing an example of a configuration of a switching power supply apparatus 900b serving as a polarity reversal chopper circuit according to Embodiment 6. The switching power supply apparatus 900b according to Embodiment 6 shown in FIG. 18 is different from the switching power supply apparatus 300 according to Embodiment 2 shown in FIG. 4 in that an input and output converting unit 940b is included instead of the input and output converting unit 140. In the following, the constituent elements substantially same as those in Embodiment 2 are assigned with the same referential numerals, and their descriptions are omitted. Descriptions are mainly given of the points different from Embodiment 2.

The input and output converting unit 940b converts, into output voltage, the input voltage input to the input terminal 110 and applied through the switching element 130, and supplies output power to the load 160 connected to the output terminal 120. As shown in FIG. 18, the input and output converting unit 940b includes a coil 941b, a diode 942b, and a capacitor 943b.

The coil 941b is an example of an energy transferring element, and is connected between (i) a connection point between the switching element 130 and the cathode of the diode 942b and (ii) a connection point between the negative side of the input terminal 110 and the positive side of the output terminal 120. The coil 941b converts, into AC output voltage, the input voltage input to the input terminal 110 and applied through the switching element 130.

The diode 942b is an example of a rectifying element. The diode 942b has an anode connected to the negative side of the output terminal 120, and a cathode connected to a connection point between the switching element 130 and the coil 941b. The diode 942b rectifies the AC output voltage generated by the coil 941b.

The capacitor 943b is an example of a smoothing capacitative element. The capacitor 943b has one terminal connected to a connection point between the anode of the diode 942b and the negative side of the output terminal 120, and the other terminal connected to a connection point between the coil 941b and the positive side of the output terminal 120. The capacitor 943b smoothes the AC output voltage generated by the coil 941b.

With the above configuration, the switching power supply apparatus 900b according to Embodiment 6 generates DC output voltage at the output terminal 120 by switching DC input voltage using the switching element 130. Here, since the switching power supply apparatus 900b is a polarity reversal chopper circuit as shown in FIG. 18, the switching power supply apparatus 900b generates output voltage with a polarity reversal to that of the input voltage.

It is to be noted that the semiconductor device which controls the switching operation of the switching element 130 is the same as the semiconductor device 400 according to Embodiment 2. Accordingly, in Embodiment 6, too, in the PFM operating mode in which the switch current peak Idp is constant relative to the output power, it is possible to increase the switch current peak Idp as the input voltage increases, in the similar manner to Embodiment 2. Hence, in the similar manner to Embodiment 1, in the PFM operating mode, it is possible to increase the power efficiency at high input voltage.

Furthermore, it is possible to increase the power efficiency at high input voltage in the entire output power range (entire load range). In particular, the loss caused by the switching operation can be reduced at high input voltage and at a light load which is significantly influenced by the loss caused by the switching operation.

Subsequently, a description is given of an example of the step-up chopper circuit.

Figure 19:
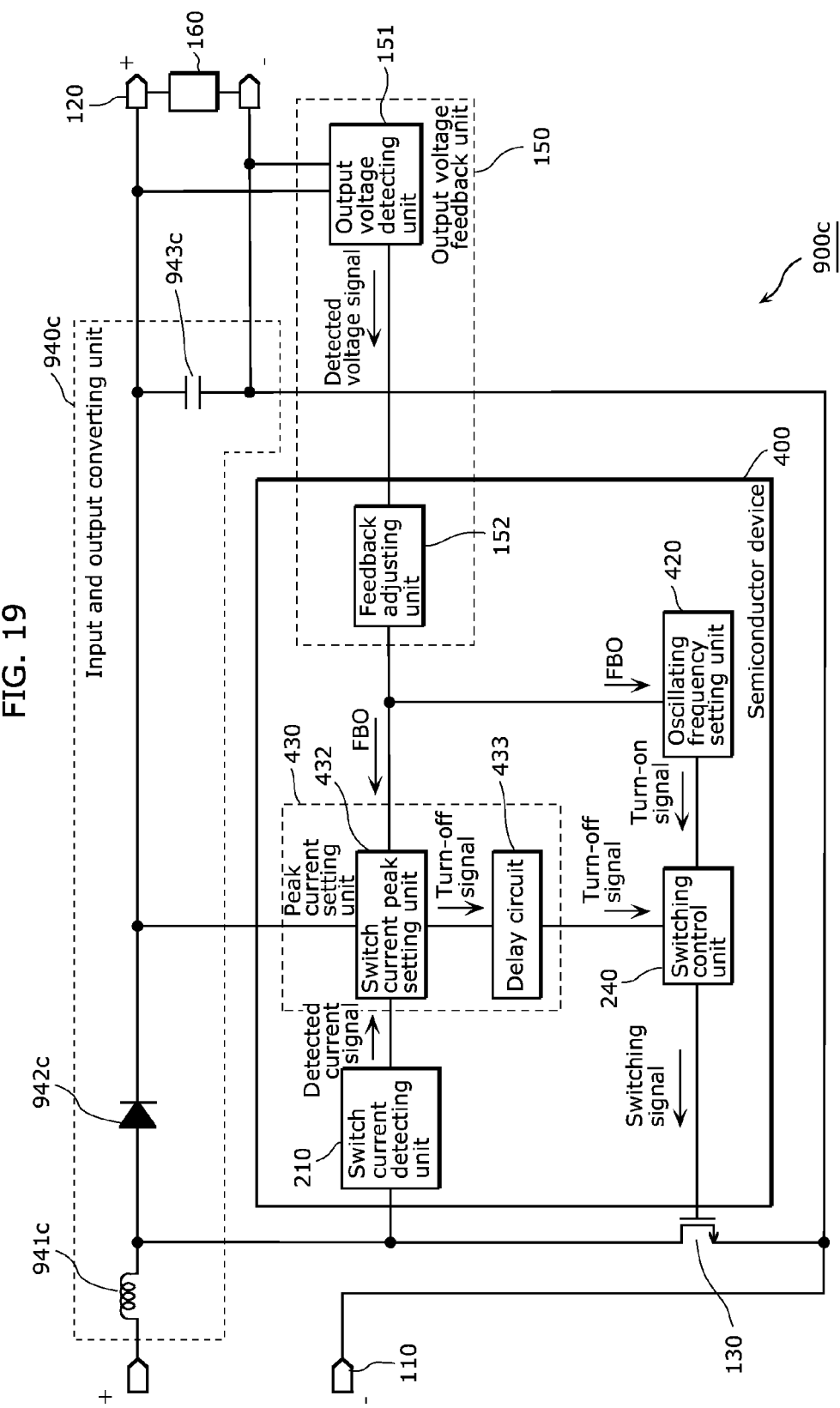
FIG. 19 is a circuit diagram showing an example of a configuration of a switching power supply apparatus serving as a step-up chopper circuit according to Embodiment 6.

FIG. 19 is a circuit diagram showing an example of a configuration of a switching power supply apparatus 900c serving as a step-up chopper circuit according to Embodiment 6. The switching power supply apparatus 900c according to Embodiment 6 shown in FIG. 19 is different from the switching power supply apparatus 300 according to Embodiment 2 shown in FIG. 4 in that an input and output converting unit 940c is included instead of the input and output converting unit 140. In the following, the constituent elements substantially same as those in Embodiment 2 are assigned with the same referential numerals, and their descriptions are omitted. Descriptions are mainly given of the points different from Embodiment 2.

The input and output converting unit 940c converts, into output voltage, the input voltage input to the input terminal 110 and applied through the switching element 130, and supplies output power to the load 160 connected to the output terminal 120. As shown in FIG. 19, the input and output converting unit 940c includes a coil 941c, a diode 942c, and a capacitor 943c.

The coil 941c is an example of an energy transferring element, and is connected between the switching element 130 and the input terminal 110. The coil 941c converts, into AC output voltage, the input voltage input to the input terminal 110 and applied through the switching element 130.

The diode 942c is an example of a rectifying element. The diode 942c has an anode connected to a connection point between the switching element 130 and the coil 941c, and a cathode connected to one terminal of the capacitor 943c and the positive side of the output terminal 120. The diode 942c rectifies the AC output voltage generated by the coil 941c.

The capacitor 943c is an example of a smoothing capacitative element. The capacitor 943c has one terminal connected to a connection point between the cathode of the diode 942c and the positive side of the output terminal 120, and the other terminal connected to the negative terminal side of the input terminal 110 and the negative side of the output terminal 120. The capacitor 943c smoothes the AC output voltage generated by the coil 941c.

With the above configuration, the switching power supply apparatus 900c according to Embodiment 6 generates DC output voltage at the output terminal 120 by switching DC input voltage using the switching element 130. Here, since the switching power supply apparatus 900c is a step-up chopper circuit as shown in FIG. 19, the switching power supply apparatus 900c generates the output voltage higher than the input voltage.

It is to be noted that the semiconductor device which controls the switching operation of the switching element 130 is the same as the semiconductor device 400 according to Embodiment 2. Accordingly, in Embodiment 6, too, in the PFM operating mode in which the switch current peak Idp is constant relative to the output power, it is possible to increase the switch current peak Idp as the input voltage increases, in the similar manner to Embodiment 2. Hence, in the similar manner to Embodiment 1, in the PFM operating mode, it is possible to increase the power efficiency at high input voltage.

Furthermore, it is possible to increase the power efficiency at high input voltage in the entire output power range (entire load range). In particular, the loss caused by the switching operation can be reduced at high input voltage and at a light load which is significantly influenced by the loss caused by the switching operation.

Embodiment 7

In the switching power supply apparatus according to Embodiment 7, the peak current setting unit sets, in a predetermined case, a current threshold such that the switch current peak (i) is constant relative to output power and (ii) increases as the input voltage increases. The switch current peak is a maximum value of current flowing through a switching element. More specifically, the peak current setting unit according to Embodiment 7 includes an input voltage detecting unit which detects input voltage and a switch current peak current setting unit which sets a current threshold to be constant relative to output power and to increase as the input voltage detected by the input voltage detecting unit increases.

Furthermore, the switching power supply apparatus according to Embodiment 7 controls the switching operation of the switching element in the PWM operating mode at a heavy load, and in the PFM operating mode at a light load.

More specifically, (i) when the output power is above the first threshold, that is, in the case of the PWM operating mode, the oscillating frequency setting unit sets the switching frequency to be constant relative to the output power, and the switch current peak setting unit sets the current threshold to increase as the output power increases. When (ii) the output power is below the first threshold, that is, in the case of the PFM operating mode, the oscillating frequency setting unit sets the switching frequency to decrease as the output power decreases, and the peak current setting unit sets the current threshold to be constant relative to the output power and the input voltage. As described above, the first threshold corresponds to the switching point between the PWM operating mode and the PFM operating mode.

Figure 20:
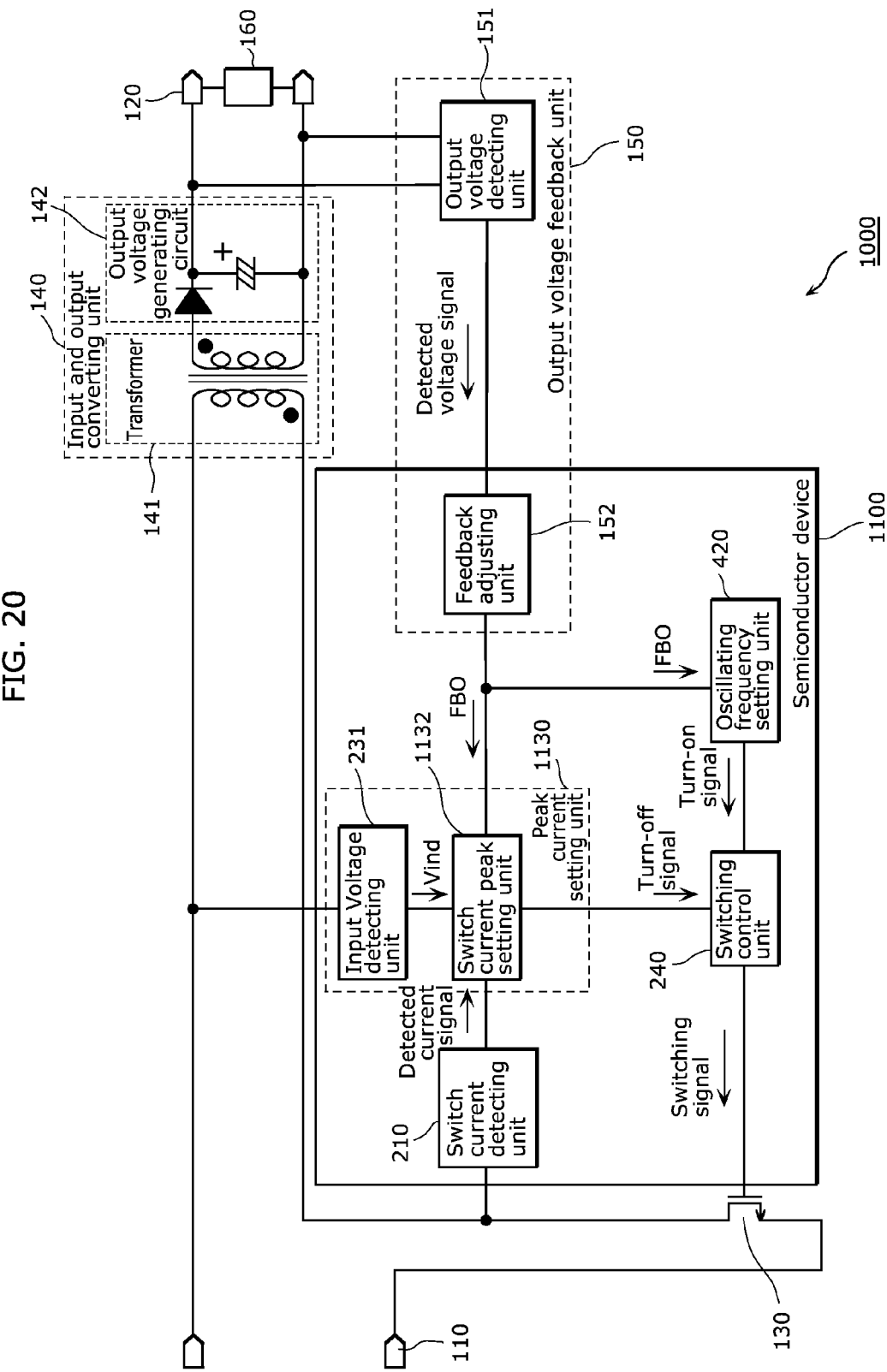
FIG. 20 is a circuit diagram showing an example of a configuration of a switching power supply apparatus according to Embodiment 7.

FIG. 20 is a circuit diagram showing an example of a configuration of a switching power supply apparatus 1000 according to Embodiment 7. The switching power supply apparatus 1000 according to Embodiment 7 shown in FIG. 20 is different from the switching power supply apparatus 100 according to Embodiment 1 shown in FIG. 1 in that a semiconductor device 1100 is included instead of the semiconductor device 200. In the following, the constituent elements substantially same as those in Embodiment 1 are assigned with the same referential numerals, and their descriptions are omitted. Descriptions are mainly given of the points different from Embodiment 1.

The semiconductor device 1100 is different from the semiconductor device 200 shown in FIG. 1 in that an oscillating frequency setting unit 420 and a peak current setting unit 1130 are included instead of the oscillating frequency setting unit 220 and the peak current setting unit 230. Since the oscillating frequency setting unit 420 is similar to that in Embodiment 2, the description thereof is omitted here.

The peak current setting unit 1130 sets, in a predetermined case, the current threshold Idp1 to control turn-off of the switching element 130, based on the detection result of the switch current detecting unit 210 and the current threshold Idp1. The current threshold Idp1 is set such that the switch current peak Idp (i) is constant relative to the output power and (ii) increases as the input voltage increases. Furthermore, the predetermined case refers to the case where the switching operation of the switching element 130 is performed according to the PFM operating mode.

As shown in FIG. 20, the peak current setting unit 1130 includes an input voltage detecting unit 231 and a switch current peak setting unit 1132.

The switch current peak setting unit 1132 sets the current threshold Idp1 to increase as the output power increases, when the feedback signal FBO is below the threshold FB1 (when output power is above the first threshold). Furthermore, the switch current peak setting unit 1132 sets the current threshold Idp1 to be constant relative to output power and to increase as the input voltage increases, when the feedback signal FBO is above the threshold FB1 (when output power is below the first threshold). Subsequently, the switch current peak setting unit 1132 outputs, to the switching control unit 240, a turn-off signal for turning off the switching element 130, when the current detected by the switch current detecting unit 210 reaches the current threshold Idp1.

Figure 21:
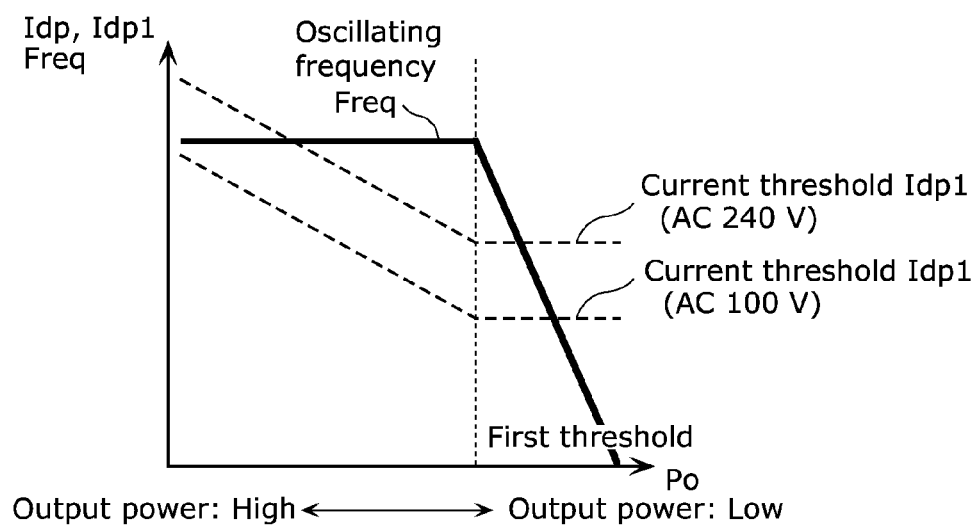
FIG. 21 is a diagram showing an example of setting of a current threshold, a switch current peak, and oscillating frequency according to Embodiment 7.

More specifically, the switch current peak setting unit 1132 sets the current threshold Idp1, based on the feedback signal FBO. Referring to FIG. 21, a description will be given later of a specific example of setting of the current threshold Idp1.

FIG. 21 is a diagram showing an example of setting of the current threshold Idp1, the switch current peak Idp, and the oscillating frequency Freq, according to Embodiment 7. In FIG. 21, the horizontal axis represents the feedback signal FBO, and the vertical axis represents the current threshold Idp1, the switch current peak Idp, and the oscillating frequency Freq. As described above, the feedback signal FBO varies according to the condition of the load 160, that is, output power.

The switch current peak setting unit 1132 sets the current threshold Idp1 to increase as the output power increases, when the output power is above the first threshold. More specifically, the switch current peak setting unit 1132 sets the current threshold Idp1 to decrease as the voltage value of the feedback signal FBO increases and to increase as the input voltage increases, when the voltage value of the feedback signal FBO is below the threshold FB1, as shown in FIG. 21.

Furthermore, the switch current peak setting unit 1132 sets the current threshold Idp1 to be constant relative to the output power, when the output power is below the first threshold. More specifically, the switch current peak setting unit 1132 sets the current threshold Idp1 to be constant relative to the voltage value of the feedback signal FBO and to increase as the input voltage increases, when the voltage value of the feedback signal FBO is above the threshold FB1, as shown in FIG. 21.

In Embodiment 7, the switch current peak setting unit 1132 outputs a turn-off signal when the current flowing through the switching element 130 reaches the current threshold Idp1, and the switching control unit 240 turns off the switching element 130 upon receipt of the turn-off signal. More specifically, the current threshold Idp1 matches the switch current peak Idp.

Accordingly, the switch current peak Idp decreases as the voltage value of the feedback signal FBO increases, and increases as the input voltage increases, when the voltage value of the feedback signal FBO is below the threshold FB1. Furthermore, the switch current peak Idp is constant relative to the voltage value of the feedback signal FBO and increases as the input voltage increases, when the voltage value of the feedback signal FBO is above the threshold FB1.

As described above, the switching power supply apparatus 1000 according to Embodiment 7 controls the switching operation in the PWM operating mode when the feedback signal FBO is below the threshold FB1, that is, at a heavy load, and controls the switching operation in the PFM operating mode when the feedback signal FBO is above the threshold FB1, that is, at a light load.

More specifically, the switching power supply apparatus 1000 according to Embodiment 7 sets, in the PWM operating mode, the current threshold Idp1 to decrease as the output power decreases and to increase as the input voltage increases, and sets, in the PFM operating mode, the current threshold Idp1 to be constant relative to output power and to increase as the input voltage increases.

Accordingly, when the feedback signal FBO is below the threshold FB1, the switch current peak Idp increases as the output power increases, and increases as the input voltage increases. Furthermore, when the feedback signal FBO is above the threshold FB1, the switch current peak Idp is constant relative to output power and increases as the input voltage increases.

Accordingly, according to the switching power supply apparatus 1000 in Embodiment 7, in the PFM operating mode in which the switch current peak Idp is constant relative to the output power, it is possible to increase the switch current peak Idp as the input voltage increases, in the similar manner to Embodiment 2. Hence, in the similar manner to Embodiment 1, in the PFM operating mode, it is possible to increase the power efficiency at high input voltage.

Furthermore, it is possible to increase the power efficiency at high input voltage in the entire output power range (entire load range). In particular, the loss caused by the switching operation can be reduced at high input voltage and at a light load which is significantly influenced by the loss caused by the switching operation.

Descriptions have been given of the switching power supply apparatus and the semiconductor device according to the present disclosure, based on the above embodiments; however, the present disclosure is not limited to the embodiments. Those skilled in the art will readily appreciate that various modifications may be made in these exemplary embodiments without materially departing from the principles and spirit of the inventive concept, the scope of which is defined in the appended Claims and their equivalents.

For example, as shown in FIG. 1, in Embodiment 1, an example has been described in which the input voltage detecting unit 231 is included and the switching operation is controlled in the PFM operating mode in the entire output power range. In contrast, as shown in FIG. 22, it may be that the delay circuit 433 is included and the switching operation is controlled in the PFM operating mode in the entire output power range.

Figure 22:
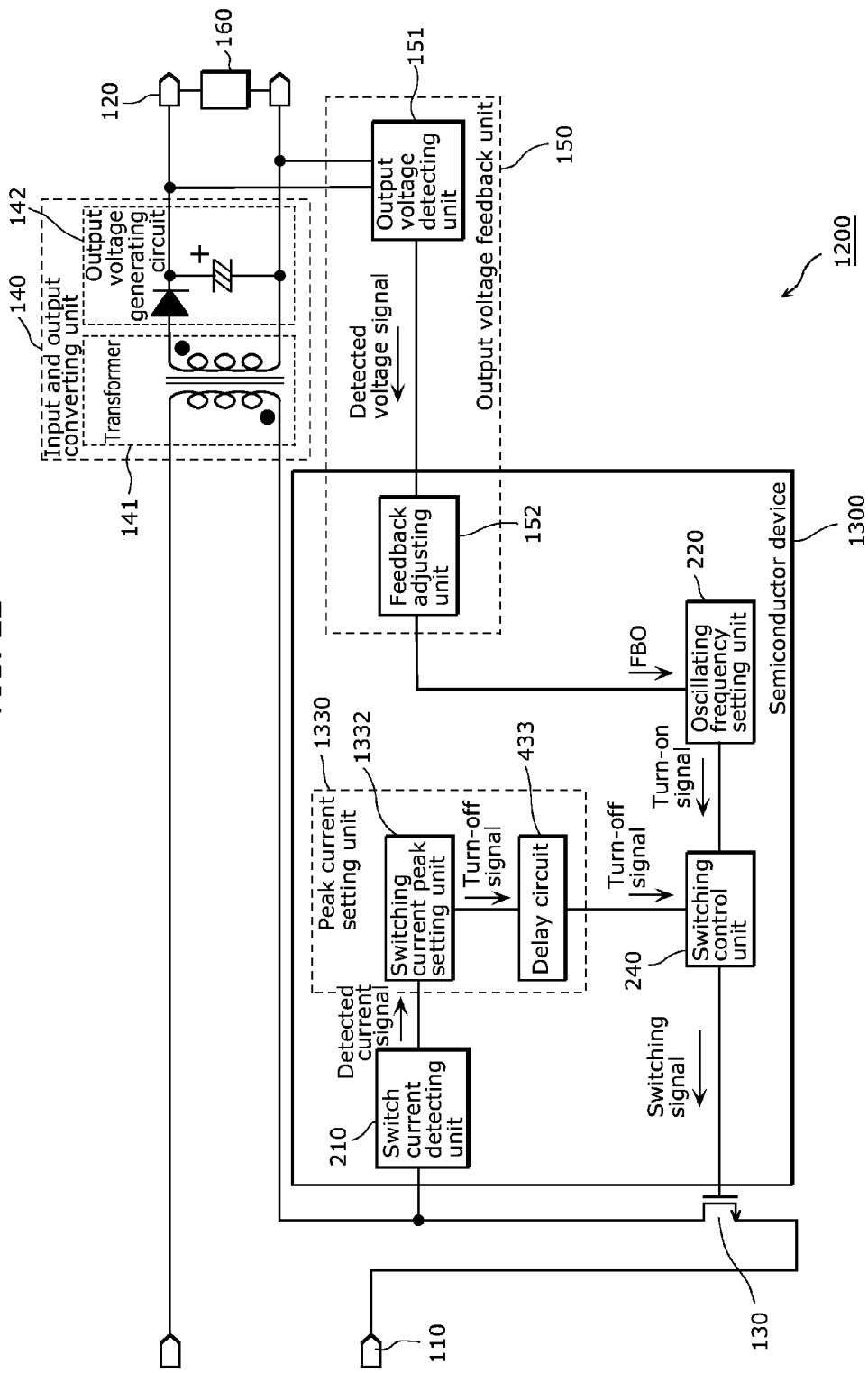
FIG. 22 is a circuit diagram showing an example of a configuration of a switching power supply apparatus according to Variation of Embodiments.

FIG. 22 is a circuit diagram showing an example of a configuration of a switching power supply apparatus 1200 according to Variation of Embodiments. The switching power supply apparatus 1200 according to Variation of Embodiments shown in FIG. 22 is different from the switching power supply apparatus 100 according to Embodiment 1 shown in FIG. 1 in that a semiconductor device 1300 is included instead of the semiconductor device 200. In the following, the constituent elements substantially same as those in Embodiment 1 are assigned with the same referential numerals, and their descriptions are omitted. Descriptions are mainly given of the points different from Embodiment 1.

The semiconductor device 1300 is different from the semiconductor device 200 shown in FIG. 1 in that a peak current setting unit 1330 is included instead of the peak current setting unit 230.

The peak current setting unit 1330 sets, in a predetermined case, the current threshold Idp1 to control turn-off of the switching element 130, based on the detection result of the switch current detecting unit 210 and the current threshold Idp1. The current threshold Idp1 is set such that the switch current peak Idp (i) is constant relative to the output power and (ii) increases as the input voltage increases. The switch current peak Idp is a maximum value of the current flowing through the switching element 130.

Furthermore, the predetermined case refers to the case where the switching operation of the switching element 130 is performed according to the PFM operating mode. In Variation of Embodiments, since the switching operation of the switching element is performed according to the PFM operating mode in the entire load range, the peak current setting unit 1330 sets the current threshold Idp1 such that (i) the switch current peak Idp is constant relative to the output power and (ii) increases as the input voltage increases, in the entire load range.

As shown in FIG. 22, the peak current setting unit 1330 includes a switch current peak setting unit 1332 and a delay circuit 433. The delay circuit 433 is similar to that in Embodiment 2.

The peak current setting unit 1330 sets the current threshold Idp1 to be constant relative to output power and input voltage. More specifically, the peak current setting unit 1330 sets the current threshold Idp1 to be constant in the entire load range, that is, in the entire output power range. Subsequently, the peak current setting unit 1330 outputs a turn-off signal to the delay circuit 433 when the current detected by the switch current detecting unit 210 reaches the current threshold Idp1.

More specifically, the delay circuit 433 delays the turn-off signal by a fixed delay period to vary the switch current peak Idp according to the input voltage. More specifically, the delay circuit 433 delays a turn-off signal by a fixed delay period such that the switch current peak Idp increases as the input voltage increases. This is because the ratio of increase of the current flowing through the switching element 130 increases as the input voltage increases, and the current flowing through the switching element 130 increases as the input voltage increases in the delay period.

Accordingly, in the PFM operating mode in which the switch current peak Idp is constant relative to the output power, it is possible to increase the switch current peak Idp as the input voltage increases, in the similar manner to Embodiment 1. Hence, in the similar manner to Embodiment 1, in the PFM operating mode, it is possible to increase the power efficiency at high input voltage.

Furthermore, the delay circuit is simply added to the switching power supply apparatus 1200 according to Variation of Embodiments, the circuit configuration can be simplified compared to the configuration with the input voltage detecting unit.

Furthermore, in Embodiments 3 and 4, descriptions have been given of an example where the current threshold Idp2 is constant relative to input voltage; however, it may be that the current threshold Idp2 also increases as the input voltage increases.

Furthermore, each processing unit included in the semiconductor devices according to respective Embodiments 1 to 7 is typically implemented as an LSI (large scale integration) which is an integrated circuit. The processing units may be individually configured as a single chip, or configured into one chip including part of all of the processing units.

The name used here is LSI, but it may also be referred to as IC, system LSI, super LSI, or ultra LSI depending on the degree of integration.

Moreover, ways to achieve integration are not limited to the LSI, and a dedicated circuit or general purpose processor can also achieve the integration. Field Programmable Gate Array (FPGA) that can be programmed after manufacturing LSI or a reconfigurable processor that allows re-configuration of the connection or setting of circuit cells in the LSI can be used for the same purpose.

Furthermore, when a circuit integration technology for replacing LSIs appears in the future with advancement in semiconductor technology and derivative other technologies, the circuit integration technology may be naturally used to integrate the functional blocks. Application of biotechnology is one such possibility.

Furthermore, the numerical numbers and values above are exemplary used for specifically describing the present disclosure; and thus, the present disclosure is not limited to such values. Furthermore, the switched states represented by on and off are used merely for specifically describing the present disclosure; and thus, different combinations of the switched states described may obtain similar results. Furthermore, the connection relationship between the constituent elements are merely used for specifically describing the present disclosure; and thus, the connection relationship which implements the functions of the present disclosure is not limited to the examples.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

According to the present disclosure, it is possible to increase power efficiency at high input voltage. For example, the present disclosure is applicable to a switching power supply apparatus which is included in a DC to DC converter, a charger, an adaptor, and others.

The invention claimed is:
1. A switching power supply apparatus comprising:
an input terminal;
an output terminal;
a switching element connected to the input terminal;
an input and output converting unit configured to convert an input voltage into an output voltage to supply output power to a load connected to the output terminal, the input voltage being input to the input terminal and applied through the switching element;
an output voltage feedback unit configured to detect the output voltage and to output a feedback signal, based on the detected output voltage;
a switch current detecting unit configured to detect a current flowing through the switching element;

an oscillating frequency setting unit configured to set a switching frequency of the switching element, based on the feedback signal;

a peak current setting unit having an operation mode in which a current threshold is set, and configured to control turn-off of the switching element, based on a result of the detection by the switching current detecting unit and the current threshold, the current threshold being set such that a switch current peak is constant regardless of a change in the output power and increases as the input voltage increases, the switch current peak being a maximum value of the current flowing through the switching element; and a switching control unit configured to control a switching operation of the switching element, based on results of the setting by the oscillating frequency setting unit and by the peak current setting unit.

2. A switching power supply apparatus according to claim 1, wherein the peak current setting unit includes:
an input voltage detecting unit configured to detect the input voltage; and
a switch current peak setting unit configured to set the current threshold to (i) be constant regardless of a change in the output power and (ii) increase as the input voltage detected by the input voltage detecting unit increases.

3. The switching power supply apparatus according to claim 2, wherein, when the output power is above a first threshold,
(i) the oscillating frequency setting unit is configured to set the switching frequency to be constant regardless of a change in the output power, and
(ii) the peak current setting unit is configured to set the current threshold to increase as the output power increases, and when the output power is below the first threshold,
(i) the oscillating frequency setting unit is configured to set the switching frequency to decrease as the output power decreases, and
(ii) the peak current setting unit is configured to set the current threshold to (1) be constant regardless of a change in the output power and (2) increase as the input voltage increases.

4. The switching power supply apparatus according to claim 3, wherein, when the output power is above the first threshold, the peak current setting unit is configured to set the current threshold to (i) be constant regardless of a change in the input voltage and (ii) increase as the output power increases.

5. The switching power supply apparatus according to claim 3, wherein, when the output power is below a second threshold that is smaller than the first threshold,
(i) the oscillating frequency setting unit is configured to set the switching frequency to be constant regardless of a change in the output power, and
(ii) the peak current setting unit is configured to set the current threshold to decrease as the output power decreases.

6. The switching power supply apparatus according to claim 1, wherein, when the output power is above a first threshold,
(i) the oscillating frequency setting unit is configured to set the switching frequency to be constant regardless of a change in the output power, and
(ii) the peak current setting unit is configured to set the current threshold to increase as the output power increases, and when the output power is below the first threshold,
(i) the oscillating frequency setting unit is configured to set the switching frequency to decrease as the output power decreases, and
(ii) the peak current setting unit is configured to set the current threshold to (1) be constant regardless of a change in the output power and (2) increase as the input voltage increases.

7. The switching power supply apparatus according to claim 6, wherein, when the output power is above the first threshold, the peak current setting unit is configured to set the current threshold to (i) be constant regardless of a change in the input voltage and (ii) increase as the output power increases.

8. The switching power supply apparatus according to claim 6, wherein, when the output power is below a second threshold that is smaller than the first threshold,
(i) the oscillating frequency setting unit is configured to set the switching frequency to be constant regardless of a change in the output power, and
(ii) the peak current setting unit is configured to set the current threshold to decrease as the output power decreases.

9. The switching power supply apparatus according to claim 1, wherein the peak current setting unit includes:
a switch current peak setting unit configured to set the current threshold to be constant regardless of changes in the output power and the input voltage, and to output a turn-off signal for turning off the switching element when the current detected by the switch current detecting unit reaches the current threshold; and
a delay circuit which outputs the turn-off signal with a delay of a predetermined period such that the switch current peak increases as the input voltage increases, and
the switching control unit is configured to turn off the switching element upon receipt of the turn-off signal output from the delay circuit.

10. The switching power supply apparatus according to claim 9, wherein, when the output power is above a first threshold,
(i) the oscillating frequency setting unit is configured to set the switching frequency to be constant regardless of a change in the output power, and
(ii) the switch current peak setting unit is configured to set the current threshold to increase as the output power increases, and when the output power is below the first threshold,
(i) the oscillating frequency setting unit is configured to set the switching frequency to decrease as the output power decreases, and
(ii) the switch current peak setting unit is configured to set the current threshold to be constant regardless of changes in the output power and the input voltage.

11. The switching power supply apparatus according to claim 10, wherein the delay circuit is configured to output the turn-off signal without applying a delay when the output power is above the first threshold, and to output the turn-off signal with a delay of the predetermined period when the output power is below the first threshold.

12. The switching power supply apparatus according to claim 10,
wherein, when the output power is below a second threshold that is smaller than the first threshold,
(i) the oscillating frequency setting unit is configured to set the switching frequency to be constant regardless of a change in the output power, and
(ii) the switch current peak setting unit is configured to set the current threshold to decrease as the output power decreases.

13. The switching power supply apparatus according to claim 12,
wherein, when the output power is below the second threshold, the delay circuit applies, to the turn-off signal, a delay which decreases as the output power decreases.

14. A semiconductor device which switches a switching element on and off to convert an input voltage into an output voltage and supply output power to a load, the semiconductor device comprising:
a feedback adjusting unit configured to output a feedback signal, based on the output voltage;
a switch current detecting unit configured to detect a current flowing through the switching element;
an oscillating frequency setting unit configured to set a switching frequency of the switching element, based on the feedback signal;
a peak current setting unit having an operation mode in which a current threshold is set, and configured to control turn-off of the switching element, based on a result of the detection by the switch current detecting unit and the current threshold, the current threshold being set such that a switch current peak is constant regardless of a change in the output power and increases as the input voltage increases, the switch current peak being a maximum value of the current flowing through the switching element; and
a switching control unit configured to control a switching operation of the switching element, based on results of the setting by the oscillating frequency setting unit and by the peak current setting unit.

* * * * *